(12) United States Patent
Huang et al.

(10) Patent No.: US 12,273,395 B2
(45) Date of Patent: Apr. 8, 2025

(54) IMS REGISTRATION DURATION MANAGEMENT SYSTEM, TERMINAL DEVICE, AND CHIP

(71) Applicant: Huawei Technologies Co., Ltd., Guangdong (CN)

(72) Inventors: Wei Huang, Shanghai (CN); Fengguang Qiu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 414 days.

(21) Appl. No.: 17/756,590

(22) PCT Filed: Nov. 13, 2020

(86) PCT No.: PCT/CN2020/128831
§ 371 (c)(1),
(2) Date: May 27, 2022

(87) PCT Pub. No.: WO2021/104054
PCT Pub. Date: Jun. 3, 2021

(65) Prior Publication Data
US 2023/0007054 A1 Jan. 5, 2023

(30) Foreign Application Priority Data
Nov. 28, 2019 (CN) .......................... 201911190054.8

(51) Int. Cl.
*H04L 65/1016* (2022.01)
*H04L 65/1073* (2022.01)
(Continued)

(52) U.S. Cl.
CPC ...... *H04L 65/1016* (2013.01); *H04L 65/1073* (2013.01); *H04W 60/00* (2013.01); *H04W 80/08* (2013.01)

(58) Field of Classification Search
CPC .......... H04L 65/1016; H04L 65/1073; H04W 60/00; H04W 80/08
See application file for complete search history.

(56) References Cited

U.S. PATENT DOCUMENTS 9,648,053 B2   5/2017   Lau et al.
10,051,017 B2  8/2018   Chiang
(Continued)

FOREIGN PATENT DOCUMENTS

CN   1859353 A    11/2006
CN   101115056 A   1/2008
(Continued)

OTHER PUBLICATIONS

3GPP TS 24.229 V16.3.0 (Sep. 2019), 3rd Generation Partnership Project; Technical Specification Group Core Network and Terminals; IP multimedia call control protocol based on Session Initiation Protocol (SIP) and Session Description Protocol (SDP); Stage 3 (Release 16), 1060 pages.
(Continued)

*Primary Examiner* — Timothy X Pham
(74) *Attorney, Agent, or Firm* — WOMBLE BOND DICKINSON (US) LLP

(57) ABSTRACT

A terminal device comprising a transceiver, a memory, and a processor is provided. The terminal device may send in a network, an IMS registration request to a network device in the network, and may start an IMS timer corresponding to the network. If the terminal device does not receive a registration accept message from the network device when the IMS timer expires, the terminal device deactivates the network. The network may be one of a first network and a second network, the network device may be one of a first network device and a second network device, and each of the first network and the second network corresponds to an IMS timer with a different duration. In this way, different
(Continued)

waiting durations may be provided for IMS registration processes in different networks, to improve user communication experience.

20 Claims, 18 Drawing Sheets

(51) Int. Cl.
*H04W 60/00* (2009.01)
*H04W 80/08* (2009.01)

(56) References Cited

U.S. PATENT DOCUMENTS

| | | | |
|---|---|---|---|
| 2007/0008957 | A1 | 1/2007 | Huang |
| 2010/0238893 | A1 | 9/2010 | Vikberg et al. |
| 2011/0268098 | A1* | 11/2011 | Keller .................. H04W 60/00 370/338 |
| 2016/0057625 | A1 | 2/2016 | Andrada et al. |
| 2016/0094397 | A1 | 3/2016 | Barth et al. |
| 2018/0103500 | A1 | 4/2018 | Chiang et al. |
| 2018/0324224 | A1* | 11/2018 | Merino Vazquez .......................... H04L 65/1104 |
| 2019/0075537 | A1* | 3/2019 | Wu ....................... H04W 76/15 |
| 2019/0356635 | A1 | 11/2019 | Chiang et al. |
| 2020/0305019 | A1* | 9/2020 | Karri .................. H04L 65/1016 |
| 2022/0400360 | A1* | 12/2022 | Chiang .................. H04W 4/50 |

FOREIGN PATENT DOCUMENTS

| | | |
|---|---|---|
| CN | 101217388 A | 7/2008 |
| CN | 101667924 A | 3/2010 |
| CN | 101990189 A | 3/2011 |
| CN | 102325141 A | 1/2012 |
| CN | 105188130 A | 12/2015 |
| CN | 105722047 A | 6/2016 |
| CN | 106790055 A | 5/2017 |
| CN | 108293042 A | 7/2018 |
| CN | 108668274 A | 10/2018 |
| CN | 109792790 A | 5/2019 |
| CN | 110140393 A | 8/2019 |
| CN | 110234109 A | 9/2019 |
| CN | 111107058 A | 5/2020 |

OTHER PUBLICATIONS

Technical Specification Group Network Andterminals Shady on IMS Proxy Call Session Control Function(P-CSCF) restoration procedures(Release 12) 3GPP TR 29.806V1.0.0 (Dec. 2013) Technical Report 31.12 2013 X31.122073).

3GPP TS 34.229-5 V0.2.0 (Nov. 2019), 3rd Generation Partnership Project; Technical Specification Group Radio Access Network; Internet Protocol (IP) multimedia call control protocol based on Session Initiation Protocol (SIP) and Session Description Protocol (SDP); User Equipment (UE) conformance specification; Part 5: Protocol conformance specification using 5G System (5GS)(Release 15), 36 pages.

XP015009039 RFC3261 Rosenberg J et al:"SIP Session Initiation Protocol", dated Jun. 1, 2002, total 269 pages.

* cited by examiner

CONT.
FROM

IMS REGISTRATION DURATION MANAGEMENT SYSTEM, TERMINAL DEVICE, AND CHIP

CROSS-REFERENCE OF RELATED APPLICATIONS

This application is a national stage of International Application No. PCT/CN2020/128831, filed on Nov. 13, 2020, which claims priority to Chinese Patent Application No. 201911190054.8, filed on Nov. 28, 2019. Both of the aforementioned applications are hereby incorporated by reference in their entireties.

TECHNICAL FIELD

This application relates to the field of communication technologies, and in particular, to an IMS registration duration management system, a terminal device, and a chip.

BACKGROUND

An Internet protocol (IP) multimedia subsystem (IMS) is a network system that is based on an IP network and used to provide a multimedia service, and a voice solution may be provided for 4G and 5G by using the IMS.

After completing a 4G or 5G network attach (attach/registration) process, a terminal device may perform an IMS domain registration process. In the conventional technology, as shown in FIG. 1, the IMS domain registration process mainly includes the following operations.

Operation 101: The terminal device sends an initial registration request to a proxy call session control function (P-CSCF), and starts a protection timer F (which is called Timer F), where timing duration (defined in 3GPP 24.229) that is set for the timer F is 128 seconds. The initial registration request may include user information, capability information of the terminal device, and the like.

Operation 102: The P-CSCF sends a 401 message to the terminal device, where the 401 message is used to request the terminal device to perform authentication, and includes authentication information.

Operation 103: The terminal device initiates a registration challenge request to the P-CSCF, and starts the protection timer F, where the timing duration (for example, the timing duration defined in 3GPP 24.229) that is set for the timer F is 128 seconds, and the registration challenge request includes the authentication information.

Operation 104: After a network side successfully authenticates the terminal device, the P-CSCF sends a 200 OK message to the terminal device, where the 200 OK message indicates that IMS domain registration is successful.

In the foregoing IMS domain registration process, if the terminal device still does not receive the 401 message after 128 seconds since the timer F is started for the first time, the terminal device determines that the IMS domain registration fails. If the 401 message is received within 128 seconds since the timer F is started for the first time, but the terminal device still does not receive the 200 OK message after 128 seconds since the timer F is started for the second time, the terminal device also determines that the IMS domain registration fails. Only when the 401 message is received within 128 seconds since the timer F is started for the first time and the 200 OK message is received within 128 seconds since the timer F is started for the second time, the terminal device determines that the IMS domain registration succeeds. Therefore, maximum time of the IMS registration process that does not include an establishment process of an IMS default bearer may theoretically reach 256 s. This process is long, and affects a call completion rate of a voice call of the terminal device.

SUMMARY

Embodiments of this application provide an IMS registration duration management system, a terminal device, and a chip, so that different waiting duration may be provided for IMS registration processes in different networks, to improve user communication experience.

According to a first aspect, this application provides an IMS registration duration management system, including a terminal device, a first network device, and a second network device. The terminal device may be configured to send, in a first network to which the terminal device is attached, an Internet protocol multimedia subsystem IMS registration request to a first network device, and start an IMS timer corresponding to the first network. The first network device may be configured to: after receiving the IMS registration request, determine whether to send a registration accept message. The terminal device may be further configured to deactivate the first network if the registration accept message from the first network device is not received when timing duration of the IMS timer corresponding to the first network reaches first specified duration. The terminal device may be further configured to send, in a second network to which the terminal device is attached, an Internet protocol multimedia subsystem IMS registration request to a second network device, and start an IMS timer corresponding to the second network. The second network device may be configured to: after receiving the IMS registration request, determine whether to send a registration accept message. The terminal device may be further configured to deactivate the second network if the registration accept message from the second network device is not received when timing duration of the IMS timer corresponding to the second network reaches second specified duration. The first specified duration is different from the second specified duration.

Based on this solution, when the terminal device is attached to different networks and initiates IMS registration, the terminal device starts the IMS timer corresponding to the first network, and deactivates the first network if the registration accept message from the first network device is not received when the timing duration of the IMS timer corresponding to the first network reaches the first specified duration. When the terminal device is attached to the second network, the terminal device starts the IMS timer corresponding to the second network, and deactivates the second network if the registration accept message from the second network device is not received when the timing duration of the IMS timer corresponding to the second network reaches the second specified duration. The first specified duration is different from the second specified duration. In this way, the specified duration of the IMS timers started when the IMS registration is initiated in different networks is different, and is configured independently based on features of the current network, so that different waiting duration may be provided for IMS registration processes in different networks, to improve user communication experience.

In design embodiment, the first network is a 4G network, and the second network is a 5G network; or the first network is a 5G network, and the second network is a 4G network.

In an embodiment, the IMS timer corresponding to the first network and the IMS timer corresponding to the second network may be a same timer, and different specified duration is set in different networks. Alternatively, the IMS timer corresponding to the first network and the IMS timer corresponding to the second network may be different timers.

In an embodiment, if the first network is a 4G network, and the second network is a 5G network, the first specified duration is greater than the second specified duration. If the first network is a 5G network, and the second network is a 4G network, the first specified duration is less than the second specified duration. In other words, the specified duration of the timer corresponding to the 4G network is greater than the specified duration of the timer corresponding to the 5G network. In this way, the terminal device can improve voice call experience in the 4G network and improve a voice connection rate in the 5G network.

In an embodiment, the first network is a 4G network, and the terminal device is further configured to deactivate the 4G network if the registration accept message from the first network device is not received when the timing duration of the IMS timer corresponding to the 4G network reaches the first specified duration. In this way, when the timing duration of the timer reaches the first specified duration, the 4G network may be deactivated in time, to search for 2G and 3G networks for voice communication.

In an embodiment, the first network is a 4G network, the second network is a 5G network, and the terminal device is further configured to: deactivate the 5G network or perform IMS registration in the 4G network if the registration accept message from the second network device is not received when the timing duration of the IMS timer corresponding to the 5G network reaches the second specified duration. In this way, the voice call completion rate in the 5G network can be improved.

In an embodiment, the first network is a 4G network, the second network is a 5G network, and the terminal device is further configured to: when the first network supports circuit switched fallback and a voice service, search for and fall back to the 2G or 3G network if the registration accept message from the first network device is not received when the timing duration of the IMS timer corresponding to the first network reaches the first specified duration, to access a voice service.

In an embodiment, the terminal device further includes a display; the first network is a 5G network, and the terminal device is further configured to: when the terminal device is attached to the 5G network, display an identifier of the 5G network on the display; and when it is determined that the registration accept message from the second network device is not received when the timing duration of the IMS timer corresponding to the 5G network reaches the second specified duration, control the display to display information indicating that the 5G network is unavailable, or control the display to display an identifier of a 4G network when the 4G network is found. According to this design, a user can view an IMS registration result in the 5G network on the display.

In an embodiment, the terminal device further includes a display, the first network is a 4G network, and the terminal device is further configured to: when the terminal device is attached to the 4G network, display an identifier of the 4G network on the display; and when it is determined that the registration accept message from the first network device is not received when the timing duration of the IMS timer corresponding to the 4G network reaches the first specified duration, control the display to display information indicating that the 4G network is unavailable, or control the display to display an identifier of the 2G or 3G network when the 2G or 3G network is found. According to this design, a user can view an IMS registration result in the 4G network on the display.

In an embodiment, the network device is further configured to send a registration accept message to the terminal device. The terminal device is further configured to: if the registration accept message is received before the timing duration of the IMS timer corresponding to the first network reaches the first specified duration, determine that the IMS registration succeeds.

In an embodiment, the first specified duration is less than 128 seconds, and the second specified duration is less than 128 seconds. Compared with a timer that is set to 128 seconds in the conventional technology, the timer in this design can reduce waiting duration of the IMS registration and improve user experience.

According to a second aspect, this application provides a terminal device, including a transceiver, a memory, and a processor. The memory is configured to store instructions, and the transceiver is configured to send, in a first network to which the terminal device is attached, an Internet protocol multimedia subsystem IMS registration request to a first network device, or send, in a second network to which the terminal device is attached, an IMS registration request to a second network device. The processor is configured to execute the instructions stored in the memory, and when the processor executes the instructions stored in the memory, the terminal device is enabled to: when the Internet protocol multimedia subsystem IMS registration request is sent to the first network device in the first network to which the terminal device is attached, start an IMS timer corresponding to the first network, and deactivate the first network if a registration accept message from the first network device is not received when timing duration of the IMS timer corresponding to the first network reaches first specified duration; and when the Internet protocol multimedia subsystem IMS registration request is sent to the second network device in the second network to which the terminal device is attached, start an IMS timer corresponding to the second network, and deactivate the second network if a registration accept message from the second network device is not received when timing duration of the IMS timer corresponding to the second network reaches second specified duration. The first specified duration is different from the second specified duration.

Based on this solution, when the terminal device is attached to different networks and initiates IMS registration, the terminal device starts the IMS timer corresponding to the first network, and deactivates the first network if the registration accept message from the first network device is not received when the timing duration of the IMS timer corresponding to the first network reaches the first specified duration. When the terminal device is attached to the second network, the terminal device starts the IMS timer corresponding to the second network, and deactivates the second network if the registration accept message from the second network device is not received when the timing duration of the IMS timer corresponding to the second network reaches the second specified duration. The first specified duration is different from the second specified duration. In this way, the specified duration of the IMS timers started when the IMS registration is initiated in different networks is different, and the timing duration of the IMS timer corresponding to different networks is configured independently based on features of the current network, so that different waiting duration may be provided for IMS registration processes in different networks, to improve user communication experience.

In an embodiment, the first network is a 4G network, and the second network is a 5G network; or the first network is a 5G network, and the second network is a 4G network.

In an embodiment, the IMS timer corresponding to the first network and the IMS timer corresponding to the second network may be a same timer, and different specified duration is set in different networks. Alternatively, the IMS timer corresponding to the first network and the IMS timer corresponding to the second network may be different timers.

In an embodiment, when the first network is a 4G network, and the second network is a 5G network, the first specified duration is greater than the second specified duration. In other words, the specified duration of the timer corresponding to the 4G network is greater than the specified duration of the timer corresponding to the 5G network. In this way, the terminal device can improve voice call experience in the 4G network and improve a voice connection rate in the 5G network.

In an embodiment, the first network is a 4G network, and the terminal device is further configured to deactivate the 4G network if the registration accept message from the first network device is not received when the timing duration of the IMS timer corresponding to the 4G network reaches the first specified duration. In this way, when the timing duration of the timer reaches the first specified duration, the 4G network may be deactivated in time, to search for 2G and 3G networks for voice communication.

In an embodiment, the first network is a 4G network, the second network is a 5G network, and the terminal device is further configured to: deactivate the 5G network or perform IMS registration in the 4G network if the registration accept message from the second network device is not received when the timing duration of the IMS timer corresponding to the 5G network reaches the first specified duration. In this way, the voice call completion rate in the 5G network can be improved.

In an embodiment, the first network is a 4G network, the second network is a 5G network, and the terminal device is further configured to: when the first network supports circuit switched fallback and a voice service, search for and fall back to the 2G or 3G network if the registration accept message from the first network device is not received when the timing duration of the IMS timer corresponding to the first network reaches the first specified duration, to access a voice service.

In an embodiment, the terminal device further includes a display, the second network is a 5G network, and the terminal device is further configured to: when the terminal device is attached to the 5G network, display an identifier of the 5G network on the display; and when it is determined that the IMS registration in the 5G network fails, control the display to display information indicating that the 5G network is unavailable, or control the display to display an identifier of a 4G network when the 4G network is found. According to this design, a user can view an IMS registration result in the 5G network on the display.

In an embodiment, the terminal device further includes a display, the first network is a 4G network, and the terminal device is further configured to: when the terminal device is attached to the 4G network, display an identifier of the 4G network on the display; and
when it is determined that the IMS registration in the 4G network fails, control the display to display information indicating that the 4G network is unavailable, or control the display to display an identifier of a 2G or 3G network when the 2G or 3G network is found. According to this design, a user can view an IMS registration result in the 4G network on the display.

In an embodiment, the terminal device is further configured to: if the registration accept message is received before the timing duration of the IMS timer corresponding to the first network reaches the first specified duration, determine that the IMS registration succeeds.

In an embodiment, the terminal device is further configured to: if the registration accept message is received before the timing duration of the IMS timer corresponding to the second network reaches the second specified duration, determine that the IMS registration succeeds.

In an embodiment, the first specified duration is less than 128 seconds, and the second specified duration is less than 128 seconds. Compared with a timer that is set to 128 seconds in the conventional technology, the timer in this design can reduce waiting duration of the IMS registration and improve user experience.

According to a third aspect, this application provides an IMS registration duration management method, where the method includes: The terminal device sends, in a first network to which the terminal device is attached, an Internet protocol multimedia subsystem IMS registration request to a first network device, start an IMS timer corresponding to the first network, and determine, if a registration accept message from the first network device is not received when timing duration of the IMS timer corresponding to the first network reaches first specified duration, that IMS registration in the first network fails; or the terminal device sends, in a second network to which the terminal device is attached, an Internet protocol multimedia subsystem IMS registration request to a second network device, start an IMS timer corresponding to the second network, and determine, if a registration accept message from the second network device is not received when timing duration of the IMS timer corresponding to the second network reaches second specified duration, that IMS registration in the second network fails.

In an embodiment, the first network is a 4G network, and the second network is a 5G network; or the first network is a 5G network, and the second network is a 4G network.

In an embodiment, the IMS timer corresponding to the first network is different from the IMS timer corresponding to the second network.

In an embodiment, if the first network is a 4G network, and the second network is a 5G network, the first specified duration is greater than second specified duration.

In an embodiment, the first network is a 4G network, and the terminal device deactivates the 4G network when determining that the IMS registration fails.

In an embodiment, the first network is a 5G network, and when determining that IMS registration in the 5G network fails, the terminal device deactivates the 5G network or performs IMS registration in the 4G network.

In an embodiment, the terminal device further includes a display, and the second network is a 5G network. When the terminal device is attached to the 5G network, the terminal device displays an identifier of the 5G network on the display. When determining that the IMS registration in the 5G network fails, the terminal device controls the display to display information indicating that the 5G network is unavailable, or controls the display to display an identifier of a 4G network when the 4G network is found.

In an embodiment, the terminal device further includes a display, and the second network is a 4G network. When the terminal device is attached to the 4G network, the terminal device displays an identifier of the 4G network on the display. When determining that the IMS registration in the 4G network fails, the terminal device controls the display to display information indicating that the 4G network is unavailable, or controls the display to display an identifier of the 2G or 3G network when the 2G or 3G network is found.

In an embodiment, if the registration accept message is received before the timing duration of the IMS timer corresponding to the second network reaches the second specified duration, the terminal device determines that the IMS registration succeeds.

In an embodiment, the first specified duration is less than 128 seconds, and the second specified duration is less than 128 seconds.

For beneficial effects of the method in any one of the third aspect or the embodiments of the third aspect, refer to beneficial effects of the terminal device in any one of the second aspect or the embodiments of the second aspect. Details are not described herein again.

According to a fourth aspect, this application provides an IMS registration duration management method, where the method includes: A network device receives an Internet protocol multimedia subsystem IMS registration request sent by a terminal device, and sends a registration accept message to the terminal device after successfully authenticating the terminal device.

According to a fifth aspect, this application provides an IMS registration duration management apparatus. The apparatus may be an apparatus used in a communications system, or may be a chip or a chip group in the apparatus that is used in the communications system. The apparatus used in the communications system may be an access network device or a terminal device. The apparatus may include a processing unit and a transceiver unit. When the apparatus is an apparatus used in the communications system, the processing unit may be a processor, and the transceiver unit may be a transceiver. The apparatus may further include a storage unit, and the storage unit may be a memory. The storage unit is configured to store instructions, and the processing unit executes the instructions stored in the storage unit, so that the network device is enabled to perform a corresponding function in the third aspect, or the terminal device is enabled to perform a corresponding function in the fourth aspect. When the apparatus is a chip or a chip group in the network device, the processing unit may be a processor, and the transceiver unit may be an input/output interface, a pin, a circuit, or the like. The processing unit executes instructions stored in the storage unit, so that the network device is enabled to perform a corresponding function in the third aspect, or the terminal device is enabled to perform a corresponding function in the fourth aspect. The storage unit may be a storage unit (for example, a register or a cache) in the chip or the chip group, or may be a storage unit (for example, a read-only memory or a random access memory) that is in the apparatus used in the communications system and that is outside the chip or the chip group.

According to a sixth aspect, this application further provides a computer-readable storage medium, where the computer-readable storage medium stores instructions, and when the instructions are run, the methods in the foregoing aspects are performed.

According to a sixth aspect, this application further provides a computer program product including instructions. When the computer program product runs on a computer, the methods described in the foregoing aspects are performed.

According to a seventh aspect, this application provides a chip. The chip includes a processor and a communications interface, and the communications interface is configured to receive code instructions, and transmit the code instructions to the processor. The processor is configured to invoke the code instructions transmitted by the communications interface, to perform the methods described in the foregoing aspects.

DESCRIPTION OF EMBODIMENTS

To make objectives, technical solutions, and advantages of this application clearer, the following further describes this application in detail with reference to accompanying drawings.

A communications method provided in this application may be applied to various communications systems, for example, a long term evolution (LTE) communications system, a 5th generation (5G) communications system, an LTE-5G hybrid architecture, a 5G new radio (NR) system, a new communications system emerging in future communications development, and the like. The communications method provided in embodiments of this application may be used provided that an IMS is used as a voice solution in a communications system.

Figure 1:
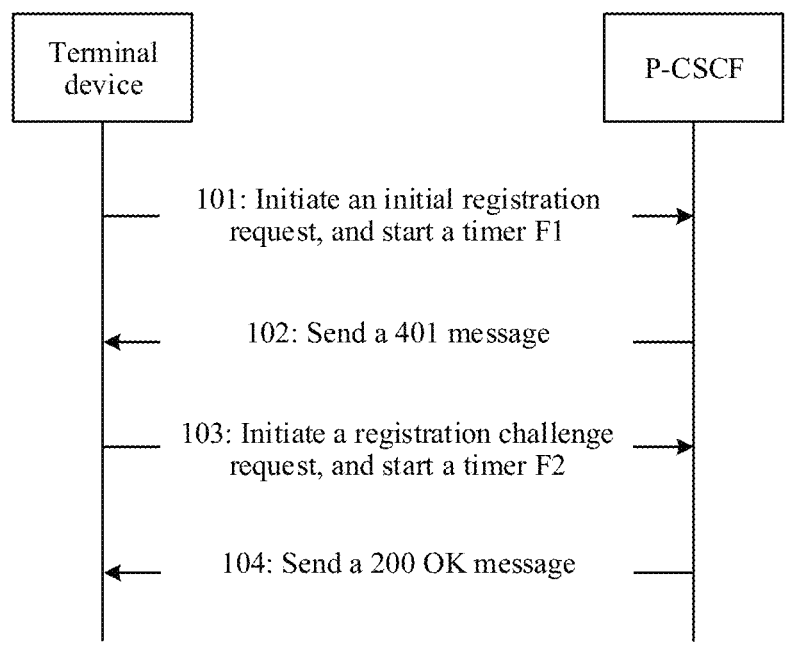
FIG. 1 is a schematic diagram of a registration process in an IMS domain in the conventional technology.
Figure 2:
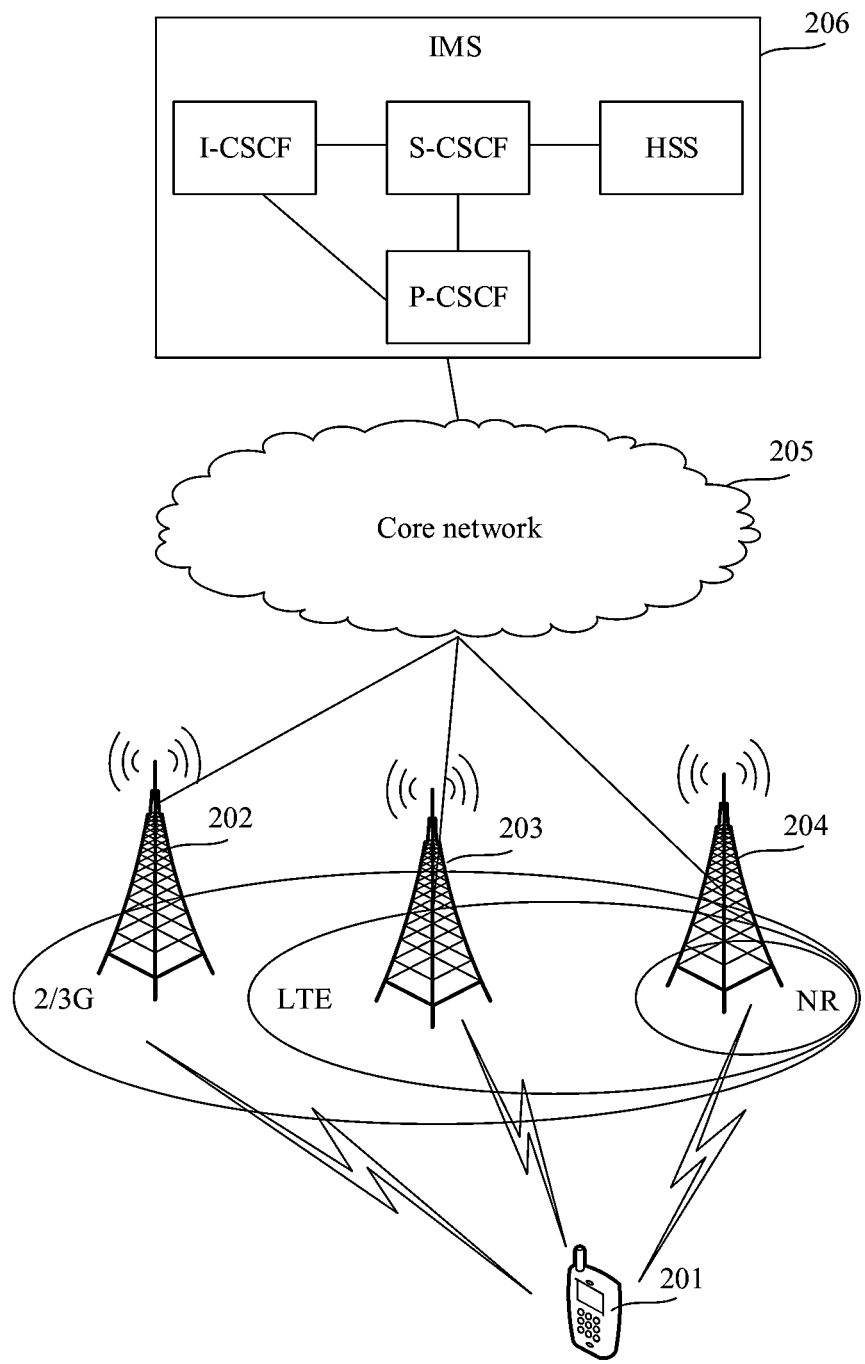
FIG. 2 is a schematic diagram of a network architecture that is applied to an embodiment of this application.

FIG. 2 is a schematic diagram of a network architecture that is applied to this application. The network architecture includes one or more terminal devices, one or more access network devices, a core network device, and an IMS system.

As shown in FIG. 2, the network architecture includes a terminal device 201, an access network device 202 that provides a 2 or 3G network for the terminal device, an access network device 203 that provides an LTE network for the terminal device, an access network device 204 that provides an NR network for the terminal device, a core network device 205, and an IP multimedia subsystem (IMS) 206.

The terminal device 201 is configured to generate a registration request, send the generated registration request to a P-CSCF entity in the IMS 206 through the access network and the core network, and receive a registration accept message returned from the IMS 206 through the core network and the access network. For example, the registration request is an initial registration request, and the registration accept message is a 401 message. For another example, the registration request is a challenge registration request, and the registration accept message is a 200 OK message.

The IP multimedia subsystem (IMS) 206 may include a proxy call session control function P-CSCF entity, an interrogating-call session control function (I-CSCF), a service call session control function (S-CSCF) entity, and a home subscriber server (HSS).

The P-CSCF entity is a first connection point from the access network to the IMS, and all session messages initiated from a terminal device that supports the IMS and terminated at a terminal device that supports the IMS need to be forwarded by the P-CSCF entity. The P-CSCF entity may be configured to forward the registration request from the terminal device to the S-CSCF entity, and forward the registration accept message to the terminal device.

The I-CSCF entity may be connected to the S-CSCF entity and the P-CSCF entity, and is configured to provide an entrance to a home network for the terminal device. In an IMS registration process, the P-CSCF entity may forward the registration request from the terminal device to the I-CSCF entity, and the I-CSCF entity may query the HSS in the IMS to select an S-CSCF entity for the terminal device. In a call process, a call message destined for an IMS network is first routed to the I-CSCF. The I-CSCF entity may query, for the terminal device through the HSS in the IMS, address information of the S-CSCF entity with which a user is registered, and then route the message to the S-CSCF.

The S-CSCF entity is a control core of the IMS, and provides functions such as session control and registration for the terminal device. The S-CSCF entity is configured to receive the registration request of the terminal device forwarded by the P-CSCF entity, cooperate with the HSS to perform authentication on the terminal device, and obtain subscription information of the terminal device from the HSS after determining that the authentication succeeds. The S-CSCF entity is further configured to connect to each application server through an ISC interface. The S-CSCF entity is further configured to trigger the application server to perform an operation and route a request message of the terminal device to a corresponding application server.

The HSS is a primary data memory that is in the IMS and that stores all data related to users and services. The data stored in the HSS includes a user identity, subscription information, access information, and the like.

The terminal device 201 in this application may also be referred to as user equipment (UE). The terminal device 201 may be deployed on land, including an indoor device, an outdoor device, a handheld device, or a vehicle-mounted device, may be deployed on a water surface (for example, on a ship), or may be deployed in the air (for example, on an airplane, a balloon, or a satellite). The terminal device may be a mobile phone, a tablet computer (pad), a computer with a wireless receiving/sending function, a virtual reality (VR) device, an augmented reality (AR) device, a wireless device in industrial control, a wireless device in self-driving, a wireless device in remote medical, a wireless device in smart grid, a wireless device in transportation safety, a wireless device in smart city, a wireless device in smart home, and the like.

It should be noted that, the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects unless specified otherwise. In the descriptions of embodiments of this application, terms such as "first" and "second" are only used for distinction and description, but cannot be understood as indication or implication of relative importance, and cannot be understood as an indication or implication of a sequence.

In the conventional technology, default IMS registration time is excessively long. For example, a value of a timer (namely, a timer F) in a protocol is defined in 3GPP 24.229 (Table 7.7.1), and is 128 s by default. Therefore, one IMS registration does not include establishment of an IMS default bearer, and theoretically, a maximum time may reach 256 s. Because the default IMS registration time is excessively long, the user cannot have better communication experience.

To reduce waiting duration of the IMS registration process and improve the user communication experience, a customized (that is, not defined in the 3GPP 24.229 protocol standard) IMS registration protection timer (which may also be referred to as an IMS timer for short) may be set. When the IMS registration fails due to timeout (or fails due to another reason), a voice solution policy of the UE is adjusted to ensure user experience.

In some embodiments, duration of the customized IMS registration protection timer may be less than duration of the default timer (Timer F) specified in the protocol. In this application, an IMS registration protection timer may be set in the terminal device, and timing duration is set to 35 seconds. When the terminal device performs IMS registration in a 4G network or a 5G network, if a 200 OK message is not received when the timing duration of the IMS registration protection timer reaches 35 seconds, the terminal device determines that the IMS registration fails.

The following separately describes IMS registration procedures in the 4G network and 5G network. To improve the user communication experience, the foregoing customized timer is used.

Figure 3:
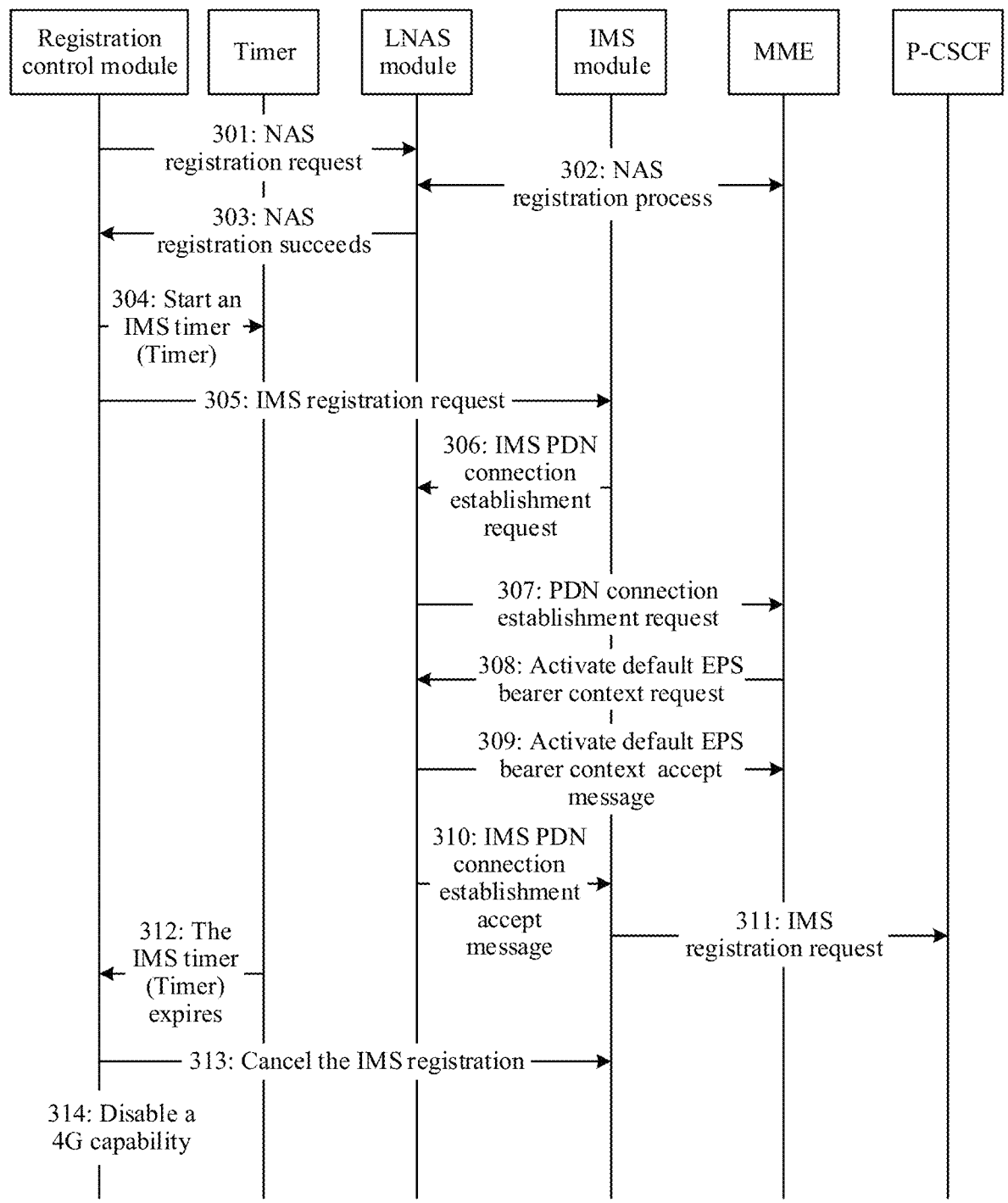
FIG. 3 is a schematic diagram of an IMS registration process in a 4G network according to an embodiment of this application.

FIG. 3 is a schematic diagram of an IMS registration process in a 4G network according to an embodiment of this application. As shown in FIG. 3, the IMS registration process in the 4G network includes the following operations.

Operation 301: A registration control module in a terminal device sends a non-access stratum (NAS) registration request to a 4G non-access stratum module (LNAS) module in the terminal device.

The LNAS module mainly includes a mobility management function and a session management function.

Operation 302: The LNAS module initiates a NAS registration process to a mobility management entity (MME).

For example, the NAS registration process may include an authorization process, an authentication process, and the like. Signaling interaction between the LNAS module and the MME in the NAS registration process is shown in the following operations S1 to S6.

S1: The LNAS module sends a NAS registration request to the MME, where the NAS registration request is used to request registration with the 4G network.

S2: The MME sends an identification request (identity request) to the LNAS module, where the identity request is used to request to obtain identification information of the terminal device.

S3: The LNAS module sends an identification accept message (identity accept) to the MME, where the identification accept message includes the identification information of the terminal device.

S4: The MME sends an authentication request to the LNAS module, where the authentication request includes authentication information.

S5: The LNAS module sends an authentication accept message to the MME, where the authentication accept message includes an authentication value obtained by the terminal device through calculation based on the authentication information, so that the MME verifies an identity of the terminal device based on the authentication value, and performs operation S6 after the verification succeeds.

S6: The MME sends a registration success accept message to the LNAS module.

Operation 303: After NAS registration succeeds, the LNAS module sends, to the registration control module, an accept message indicating that the NAS registration succeeds.

Operation 304: The registration control module starts an IMS timer. For example, timing duration of the IMS timer is 35 seconds.

Operation 305: The registration control module sends an IMS registration request to an IMS module.

For example, operation 304 and operation 305 may be performed at the same time. To be specific, the IMS timer is started when the registration control module sends the IMS registration request to the IMS module. In another example, operation 305 may be performed before operation 304.

Operation 306: The IMS module in the terminal device sends an IMS packet data network (PDN) connection establishment request to the LNAS module.

Operation 307: The LNAS module sends the PDN connection establishment request to the MME.

Operation 308: The MME sends an activate default EPS bearer context request to the LNAS module.

Operation 309: The LNAS module sends an activate default EPS bearer context accept (act default eps bearer context accept) message to the MME module.

Operation 310: The LNAS module sends an IMS PDN connection establishment accept message to the IMS module.

Operation 311: The IMS module sends an IMS registration request to a P-CSCF.

Operation 312: When the timing duration of the IMS Timer reaches 35 seconds, the IMS timer sends an IMS timer timeout message to the registration control module. Then, the registration control module may perform operation 313 or operation 314, or does not perform operation 313 and operation 314.

Operation 313: The registration control module sends an IMS registration cancellation notification message to the IMS module.

In some embodiments, for a dual standby single pass mobile phone, IMS registration may be canceled to release a radio frequency resource, so as to reduce impact on another card. In an embodiment, the UE may disable an LTE network (for example, when the network does not support CSFB). Then, the UE searches for and switches to a 2G or 3G network to support a voice call. In an embodiment, when the network supports CSFB, the UE may also fall back to the 2G or 3G network to perform a voice call.

Operation 314: The registration control module deactivates the 4G network.

In operation 314, deactivating the 4G network may also be understood as disabling a 4G capability of the terminal device. For example, the 4G network may be mainly deactivated by using the following operations S7 to S9.

S7: The LNAS module sends a PDN disconnect request to the MME.

S8: The MME sends a deactivate default EPS bearer context request to the LNAS module.

S9: The MME sends a deactivate default EPS bearer context accept message to the LNAS module.

Figure 4:
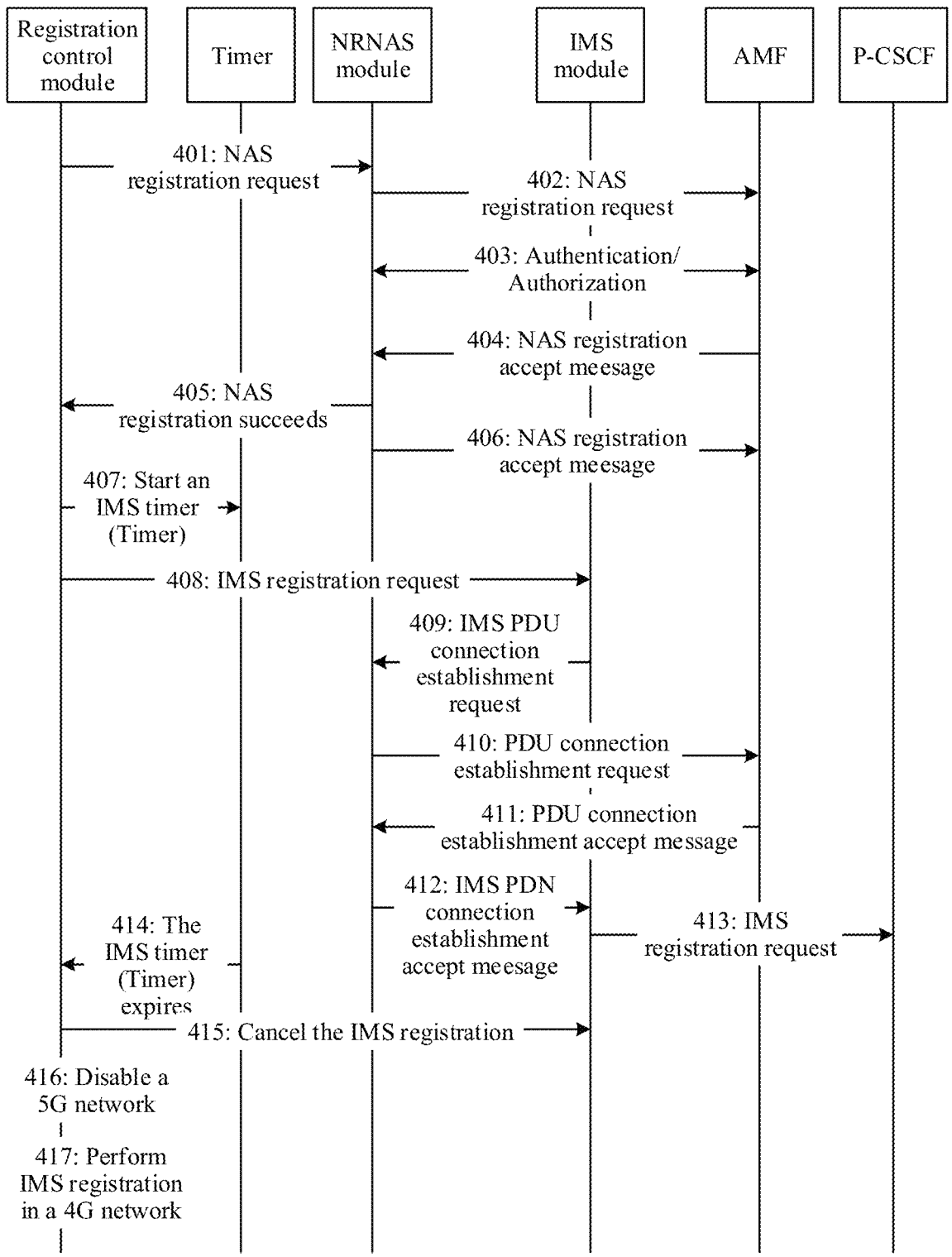
FIG. 4 is a schematic diagram of an IMS registration process in a 5G network according to an embodiment of this application.

FIG. 4 is a schematic diagram of an IMS registration process in a 5G network according to an embodiment of this application. As shown in FIG. 4, the IMS registration process in the 5G network includes the following operations.

Operation 401: A registration control module in a terminal device sends a NAS registration request to a 5G non-access stratum (NRNAS) module in the terminal device.

The NRNAS module mainly includes a mobility management function and a session management function.

Operation 402: The NRNAS module sends a NAS registration request to an access and mobility management function (AMF) entity.

Operation 403: The AMF entity performs processes such as authentication and authorization with the terminal device. For a specific signaling interaction process, refer to operations S1 to S6 in FIG. 3. Details are not described herein again.

Operation 404: The AMF entity sends, to the NRNAS module, an accept message indicating that NAS registration succeeds.

Operation 405: The NRNAS module sends, to the registration control module, the accept message indicating that the NAS registration succeeds.

Operation 406: The NRNAS module sends a NAS registration complete message to the AMF entity.

Operation 407: The registration control module starts an IMS timer. For example, timing duration of the IMS timer is 35 seconds.

Operation 408: The registration control module sends an IMS registration request to an IMS module.

For example, operation 407 and operation 408 may be performed at the same time. To be specific, the IMS timer is started when the registration control module sends the IMS registration request to the IMS module. In another example, operation 408 may be performed before operation 407.

Operation 409: The IMS module in the terminal device sends an IMS protocol data unit (PDU) connection establishment request to the NRNAS module.

Operation 410: The NRNAS module sends a PDU connection establishment request to the AMF entity.

Operation 411: The AMF entity sends a PDU connection establishment accept message to the NRNAS module.

Operation 412: The NRNAS module sends an IMS PDU connection establishment accept message to the IMS module.

Operation 413: The IMS module sends an IMS registration request to a P-CSCF.

Operation 414: When the timing duration of the IMS timer reaches 35 seconds, the IMS timer sends an IMS timer timeout notification message to the registration control module. Then, the registration control module may perform operation 415, operation 416, or operation 417.

Operation 415: The registration control module sends an IMS registration cancellation notification message to the IMS module.

Operation 416: The registration control module deactivates the 5G network.

After the registration timer expires, the registration control module notifies a related module that an IMS capability is unavailable. The UE disables an NR network, and then searches for and switches to a 2G, 3G, or 4G network to support a voice call.

In operation 316, deactivating the 5G network may also be understood as disabling a 5G capability of the terminal device. For example, the 5G network may be mainly deactivated by using the following operations S10 and S11.

S10: The NRNAS module sends a PDU session release request to the AMF.

S11: The AMF sends a PDU session release accept message to the NRNAS module.

Operation 417: The terminal device performs IMS registration in the 4G network. For example, for an IMS registration process in the 4G network, refer to the process shown in FIG. 3.

In the foregoing embodiment, the IMS registration protection timers in the 4G network and the 5G network are not distinguished between 4G and 5G, and cannot be independently configured based on features of a current network. Consequently, optimal user experience cannot be ensured.

Generally, if the 4G network supports CSFB, before the IMS registration succeeds, voice communication can be fallen back to the 2 or 3G network through the 4G network. Therefore, the voice communication can be guaranteed through a CS domain. However, voice communication in the 5G network can be performed only through an IMS domain, and cannot be ensured before the IMS registration succeeds. The IMS registration in the 4G network and the IMS registration in the 5G network are separately described below with reference to an example of a voice call scenario.

Figure 5:
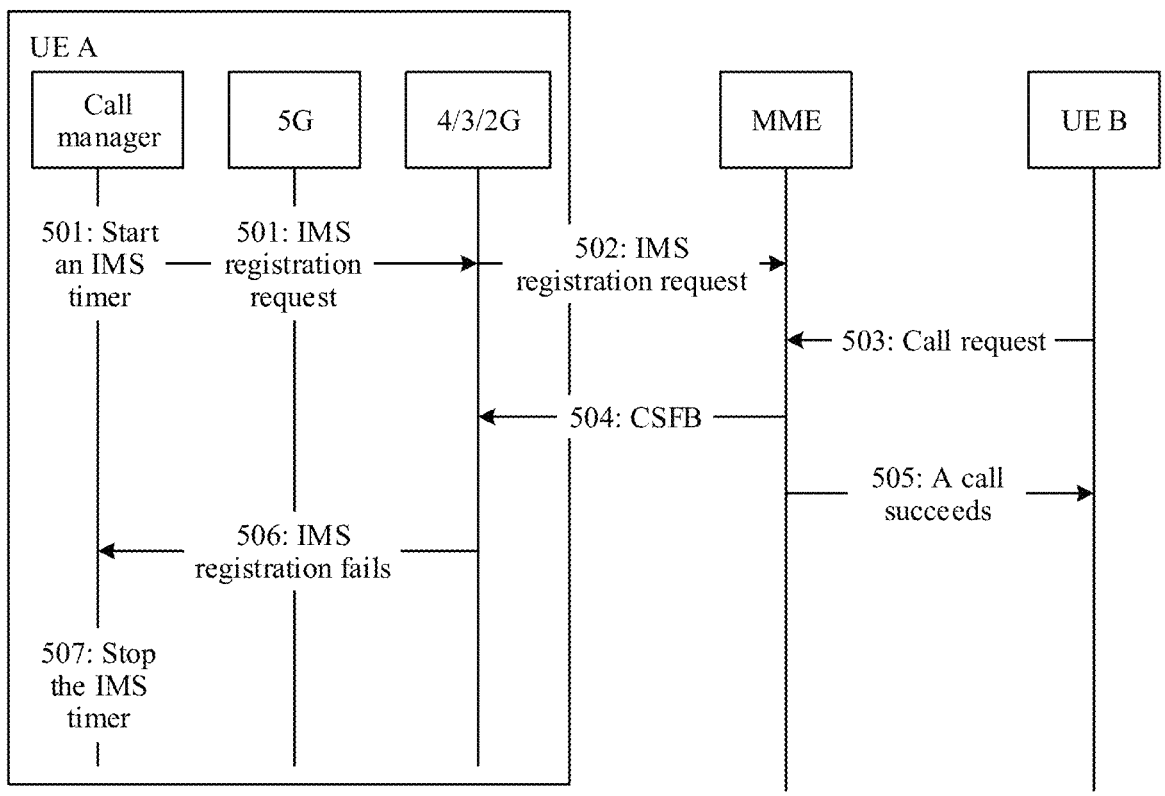
FIG. 5 is a schematic diagram of an IMS registration process in a call scenario in a 4G network according to an embodiment of this application.

FIG. 5 is a schematic diagram of an IMS registration process in a voice call scenario in a 4G network according to an embodiment of this application. As shown in FIG. 5, the IMS registration process mainly includes the following operations.

Operation 501: A call manager (callmanger) in a terminal device (UE) A sends an IMS registration request to a 4G module, and starts an IMS protection timer. For example, timing duration of the IMS timer is 35 seconds.

Operation 502: The 4G module initiates an IMS registration request to an MME.

Operation 503: Before IMS registration succeeds, the MME receives a call request from a UE B.

Operation 504: The MME indicates the UE A to fall back from the 4G network to a 2G or 3G network, and sends the call request to the UE A.

Before the IMS registration succeeds, the UE A falls back from the 4G network to the 2G or 3G network, and voice communication can be ensured through CSFB. However, the 2G or 3G network does not support an IMS domain. Consequently, the IMS registration cannot be continued. Therefore, after operation 504, operation 505 and operation 506 are performed, and may be performed in any sequence.

Operation 505: The MME sends a call success accept message to the UE B.

Operation 506: A 2G/3G/4G module in the UE A notifies the call manager that the IMS registration fails.

Operation 507: The call manager stops the IMS protection timer.

It can be learned that, when CSFB is supported, voice communication in the 4G network is ensured through fallback to a CS domain. However, call experience in the CS domain is poorer than that in the IMS domain. Therefore, the timing duration of the IMS timer in the 4G network may be appropriately configured to be longer. In this way, when the IMS registration process is not interrupted by a call, for example, after the call ends, the IMS registration timer does not expire, the UE A may return to the 4G network again to continue the IMS registration. In this way, there may be more chances of successful registration. If registration with the IMS domain succeeds, the call experience in the 4G network can be improved.

Figure 6:
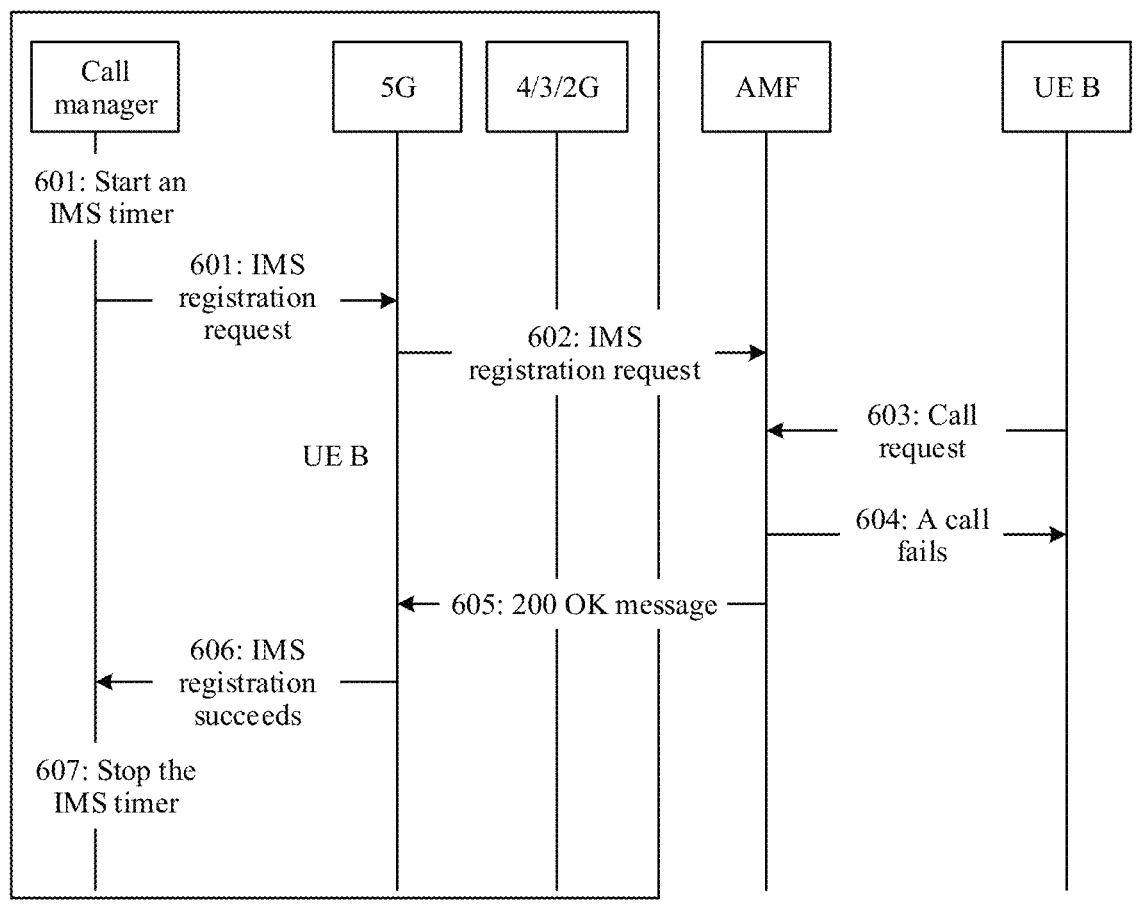
FIG. 6 is a schematic diagram of an IMS registration process in a call scenario in a 5G network according to an embodiment of this application.

FIG. 6 is a schematic diagram of an IMS registration process in a voice call scenario in a 5G network according to an embodiment of this application. As shown in FIG. 6, the IMS registration process mainly includes the following operations.

Operation 601: A call manager (callmanger) in a terminal device (UE) A sends an IMS registration request to a 5G module, and starts an IMS protection timer. For example, timing duration of the IMS timer is 35 seconds.

Operation 602: The 5G module initiates an IMS registration request to an AMF.

After operation 602, the AMF further authenticates the UE A.

Operation 603: Before IMS registration succeeds, the AMF receives a call request from a UE B.

Before the IMS registration succeeds, the 5G network cannot provide a voice communications service. As a result, the UE B cannot call the UE A.

Operation 604: The AMF sends a call accept fail message to the UE B.

Operation 605: After the AMF successfully authenticates the UE A, the AMF sends a 200 OK message to the 5G module of the UE A.

Operation 606: The 5G module of the UE A sends an IMS registration success message to the call manager.

Operation 607: The UE A stops the IMS protection timer.

It can be learned that in the 5G network, a voice call can be performed only through an IMS domain. Before the IMS registration succeeds, the UE A directly fails to be called. Consequently, voice communication cannot be ensured. To ensure a call connection rate, the timing duration of the IMS timer in the 5G network may be appropriately configured to be shorter. In this way, after the IMS registration in the 5G network fails, a 5G capability of the terminal device is disabled, and then the terminal device falls back to a 2G, 3G, or 4G network to listen to the call request, so that the UE A can receive the call request of the UE B.

It can be learned that, in the foregoing embodiment, a same IMS timer and unified timing duration are used in the 4G network and the 5G network. Consequently, the voice call experience in the 4G network and the voice connection rate in the 5G network cannot be improved at the same time.

Therefore, further, this application further provides an embodiment. Compared with the foregoing embodiment in which the IMS registration protection timer in the 4G network and the 5G network cannot distinguish the 4G network and the 5G network, and cannot be independently configured based on features of a current network, in this embodiment of this application, different timers may be enabled based on different networks, or different duration may be set for a same timer, to ensure optimal user experience. The following separately describes the two embodiments.

In embodiment 1, a same IMS timer A is used to separately time IMS registration processes of the terminal device in different networks, and different timing duration is set when timing is performed on different networks. For example, when an IMS timer A is used to time the IMS registration process in the 4G network, timing duration of the IMS timer A is set to first duration. When the IMS timer A is used to time the IMS registration process in the 5G network, the timing duration of the IMS timer A is set to second duration.

Figure 7:
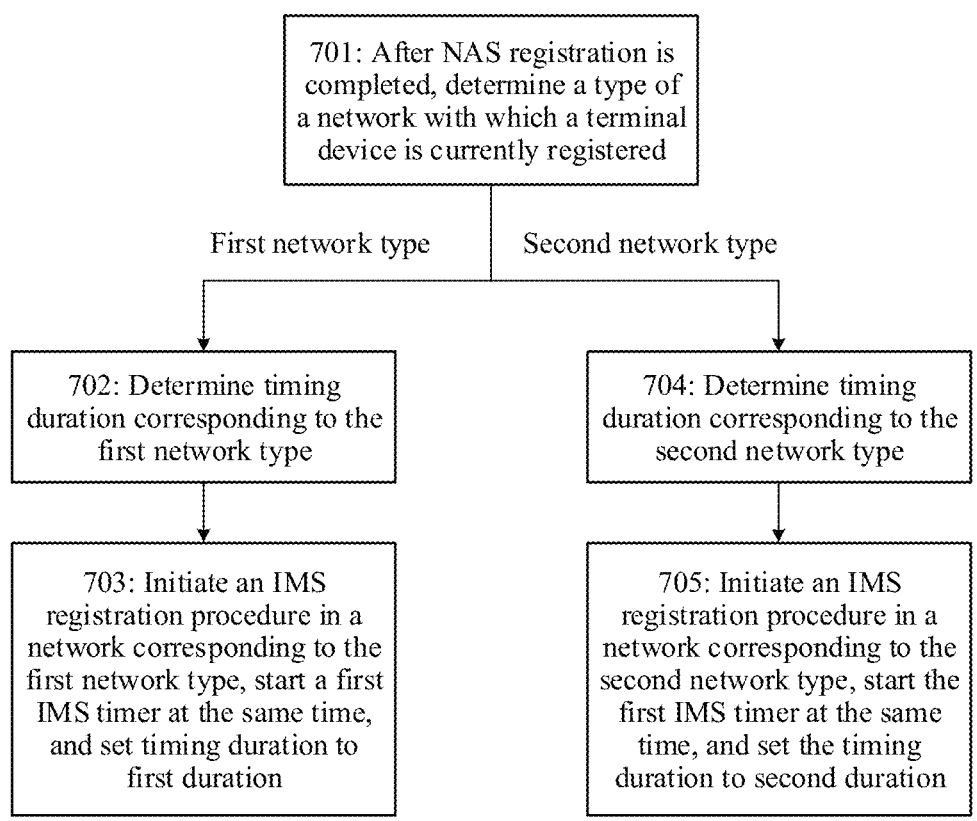
FIG. 7 is a schematic diagram of a communications method according to an embodiment of this application.

FIG. 7 is a schematic diagram of a communications method according to an embodiment of this application. The communications method mainly includes the following operations.

Operation 701: A registration control module in a terminal device determines a type of a network with which the terminal device is currently registered. If the type of the network with which the terminal device is registered is a first network type, operation 702 is performed. If the type of the network with which the terminal device is registered is a second network type, operation 704 is performed.

For example, in a network search process, if the terminal device finds a 5G network, the terminal device initiates NAS registration with the network, and is attached to the 5G network after the NAS registration succeeds. If the terminal device finds a 4G network, the terminal device initiates NAS registration with the network, and is attached to the 4G network after the NAS registration succeeds. Then, whether the terminal device currently performs IMS registration in the 4G network or the 5G network may be determined based on a network type of the network to which the terminal device is attached. For example, if the terminal device is currently attached to the 4G network, it may be determined that the type of the network with which the terminal device currently performs IMS registration is 4G. For example, if the terminal device is currently attached to the 5G network, it may be determined that a type of the network with which the terminal device currently performs IMS registration is 5G.

Operation 702: The registration control module determines timing duration corresponding to the first network type.

In some embodiments, a configuration file in a non-volatile memory stores timing duration corresponding to various network types. When the terminal is powered on, the registration control module may read, from the configuration file in the non-volatile memory, the timing duration corresponding to the first network type, and store the timing duration in a memory. When the terminal runs, the timing duration is read from the memory for use. For example, the read timing duration is first duration.

Operation 703: Initiate an IMS registration procedure in the network corresponding to the first network type, start a first IMS timer at the same time, and set timing duration of the first IMS timer to the first duration.

Operation 704: Determine timing duration corresponding to the second network type.

In some embodiments, the registration control module may read, from the configuration file in the non-volatile memory, the timing duration corresponding to the second network type. For example, the read timing duration is second duration.

Operation 705: Initiate an IMS registration procedure in the network corresponding to the second network type, start the first IMS timer at the same time, and set the timing duration of the first IMS timer to the second duration.

For example, both the first duration and the second duration may be less than 128 seconds.

In the example shown in FIG. 7, for example, if the first network type is a 4G network, the second network type is a 5G network. If the first network type is a 5G network, the second network type is a 4G network. For the IMS registration procedure initiated in the 4G network, refer to the related content in FIG. 3. For the IMS registration procedure initiated in the 5G network, refer to the related content in FIG. 4. Details are not described herein again.

For example, the first network type is a 4G network, and the second network type is a 5G network. The timing duration of the first IMS timer started in the 4G network is set to the first duration, and the timing duration of the first IMS timer started in the 5G network is set to the second duration. In an embodiment, the first duration is different from the second duration. Further, the first duration is greater than the second duration. For example, the first duration is 35 seconds, and the second duration is 25 seconds. In this way, the terminal device can improve voice call experience in the 4G network and improve a voice connection rate in the 5G network, so that the terminal device can implement different IMS registration protection duration in different network technologies, to ensure optimal user experience in different networks.

In embodiment 2, different IMS timers are used to time IMS registration processes of the terminal device in different networks. For example, an IMS timer A is used to time the IMS registration process in the 4G network, and first duration is configured for the IMS timer A. An IMS timer B is used to time the IMS registration process in the 5G network, and second duration is configured for the IMS timer B. In an embodiment, the first duration and the second duration may be different. For example, the first duration is greater than the second duration. For example, the first duration is 35 seconds, and the second duration is 25 seconds.

Figure 8:
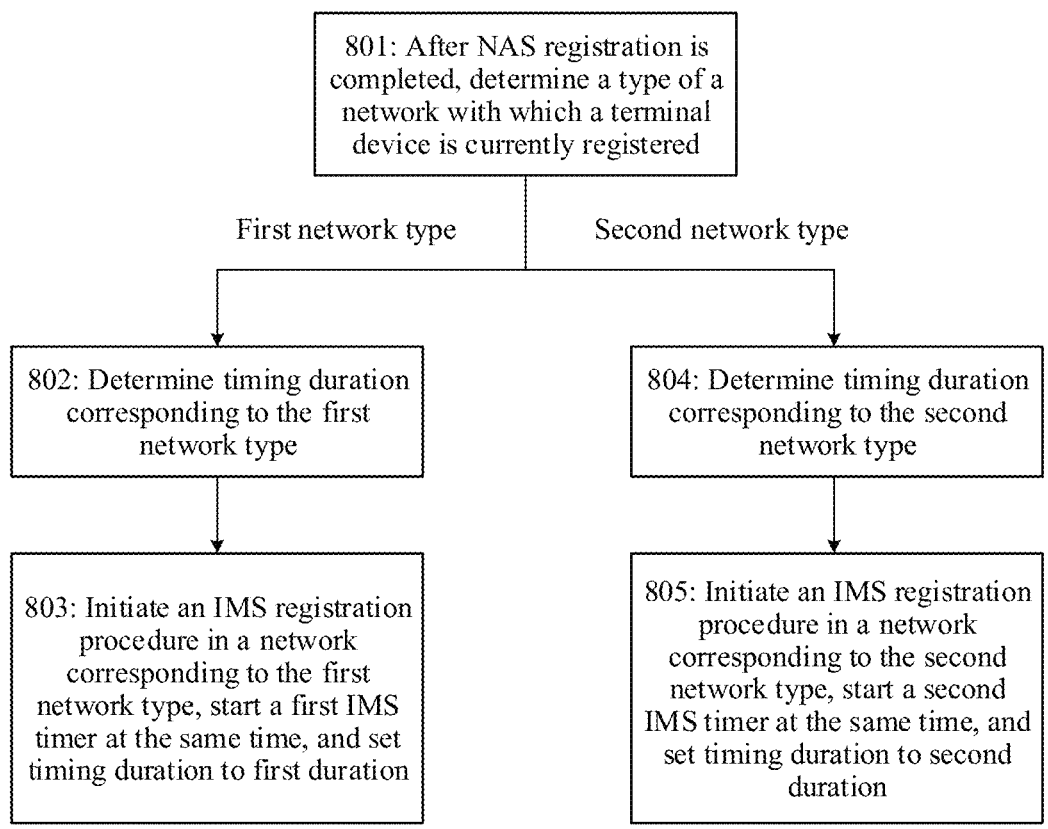
FIG. 8 is a schematic diagram of a communications method according to an embodiment of this application.
Figure 9A:
FIG. 9($a$) to FIG. 9($d$) are a schematic diagram of a group of interfaces according to an embodiment of this application.
Figure 9B:
Figures 9A, 9C:
Figure 9D:

FIG. 8 is a schematic diagram of another communications method according to an embodiment of this application. The communications method mainly includes the following operations.

Operation 801: A registration control module in a terminal device determines a type of a network with which the terminal device is currently registered. If the type of the network with which the terminal device is currently registered is a first network type, operation 802 is performed. If the type of the network with which the terminal device is currently registered is a second network type, operation 804 is performed.

For example, in a network search process, if the terminal device finds a 5G network, the terminal device initiates NAS registration with the network, and is attached to the 5G network after the NAS registration succeeds. If the terminal device finds a 4G network, the terminal device initiates NAS registration with the network, and is attached to the 5G network after the NAS registration succeeds. Therefore, whether the terminal device currently performs IMS registration in the 4G network or the 5G network may be determined based on a network type of the network to which the terminal device is attached. For example, if the terminal device is currently attached to the 4G network, it may be determined that the type of the network with which the terminal device currently performs IMS registration is 4G.

For example, if the terminal device is currently attached to the 5G network, it may be determined that a type of the network with which the terminal device currently performs IMS registration is 5G.

Operation 802: The registration control module determines timing duration corresponding to the first network type.

For example, a configuration file in a non-volatile memory stores timing duration corresponding to various network types. When the terminal is powered on, the registration control module may read, from the configuration file in the non-volatile memory, the timing duration corresponding to the first network type, and store the timing duration in a memory. When the terminal runs, the timing duration is read from the memory for use. For example, the read timing duration is first duration.

Operation 803: Initiate an IMS registration procedure in the network corresponding to the first network type, start a first IMS timer at the same time, and set timing duration of the first IMS timer to the first duration.

Operation 804: Determine timing duration corresponding to the second network type.

For example, the registration control module may read, from the configuration file in the non-volatile memory, the timing duration corresponding to the second network type. For example, the read timing duration is second duration.

Operation 805: Initiate an IMS registration procedure in the network corresponding to the second network type, start a second IMS timer at the same time, and set the timing duration of the second IMS timer to the second duration.

For example, both the first duration and the second duration may be less than 128 seconds.

In the example shown in FIG. 8, for example, if the first network type is a 4G network, the second network type is a 5G network. If the first network type is a 5G network, the second network type is a 4G network. For the IMS registration procedure initiated in the 4G network, refer to the related content in FIG. 3. For the IMS registration procedure initiated in the 5G network, refer to the related content in FIG. 4. Details are not described herein again.

For example, the first network type is a 4G network, and the second network type is a 5G network. The timing duration of the first IMS timer started in the 4G network is set to the first duration, and the timing duration of the second IMS timer started in the 5G network is set to the second duration. The first duration is greater than the second duration. For example, the first duration is 35 seconds, and the second duration is 25 seconds. In this way, voice call experience of the terminal device in the 4G network can be improved, and a voice call connection rate of the terminal device in the 5G network can be improved. In this way, the terminal device can implement different IMS registration protection duration in different network technologies, to implement optimal user experience in different networks.

It should be understood that in any one of the foregoing embodiments of this application, a protection phase of the IMS timer may include an IMS registration process, or may include both an IMS default bearer establishment process (which is an IMS PDN establishment process in the 4G network or an IMS PDU session establishment process in the 5G network) and an IMS registration process.

The following uses a mobile phone as an example to describe how to test IMS registration duration in the 4G network.

In an example, in the 4G network, an MME does not support circuit switched fallback (CSFB). When the mobile phone receives an operation of enabling a 4G switch or disabling an airplane mode performed by a user, the mobile phone searches for a network, and performs a NAS registration process in the 4G network after finding the 4G network. When the mobile phone completes NAS registration and is attached to the 4G network, a 4G network identifier is displayed on a status bar of the mobile phone, as shown in FIG. 9(*a*). The mobile phone starts an IMS registration procedure and receives a voice call during this procedure. Then, if the mobile phone does not receive an IMS registration accept message from a network side when the timing duration of the IMS timer reaches 35 seconds, the following statuses may be displayed on the status bar of the mobile phone. In a possible case, information indicating that the 4G network is unavailable is displayed on the status bar of the mobile phone, as shown in FIG. 9(*d*). In another possible case, the mobile phone is switched to a non-4G network, and after the mobile phone is switched to a 3G network, a 3G network identifier is displayed on the status bar of the mobile phone, as shown in FIG. 9(*b*); or when the mobile phone is switched to a 2G network, a 2G network identifier is displayed on the status bar of the mobile phone, as shown in FIG. 9(*c*).

After the mobile phone starts the IMS registration procedure, the mobile phone may test the timing duration of the IMS timer in the following two manners. In one manner, timing starts when an MME receives a PDN connection establishment request (as described in operation 307), and ends when the information indicating that the 4G network is unavailable or the 2G or 3G network identifier is displayed on the status bar of the mobile phone. A difference between timing starting time and timing ending time is the specified duration of the IMS timer. In another manner, timing starts when a P-CSCF receives an IMS registration request (as described in operation 311), and ends when the information indicating that the 4G network is unavailable or the 2G or 3G network identifier is displayed on the status bar of the mobile phone. A difference between timing starting time and timing ending time is the specified duration of the IMS timer.

In another example, in the 4G network, the MME does not support CSFB. When the mobile phone receives an operation of enabling a 4G switch or disabling an airplane mode performed by a user, the mobile phone searches for a network, and performs a NAS registration process in the 4G network after finding the 4G network. When the mobile phone completes NAS registration and is attached to the 4G network, a 4G network identifier is displayed on a status bar of the mobile phone, as shown in FIG. 9(*a*). After the mobile phone starts the IMS registration procedure, when the timing duration of the IMS timer reaches 35 seconds, if the mobile phone still does not receive an IMS registration accept message from a network side, the information indicating that the 4G network is unavailable is displayed on the status bar of the mobile phone, as shown in FIG. 9(*d*).

After the mobile phone starts the IMS registration procedure in the 4G network, the mobile phone may test the timing duration of the IMS timer in the following two manners. In one manner, timing starts when an MME receives a PDN connection establishment request (as described in operation 307), and ends when the information indicating that the 4G network is unavailable is displayed on the status bar of the mobile phone. A difference between timing starting time and timing ending time is the specified duration of the IMS timer. In another manner, timing starts when a P-CSCF receives an IMS registration request (as described in operation 311), and ends when the information indicating that the 4G network is unavailable (as described in operation 314) is displayed on the status bar of the mobile phone. A difference between timing starting time and timing ending time is the specified duration of the IMS timer.

The following uses a mobile phone as an example to describe how to test IMS registration duration in the 5G network.

Figure 10A:
FIG. 10($a$) to FIG. 10($d$) are a schematic diagram of another group of interfaces according to an embodiment of this application.
Figure 10B:
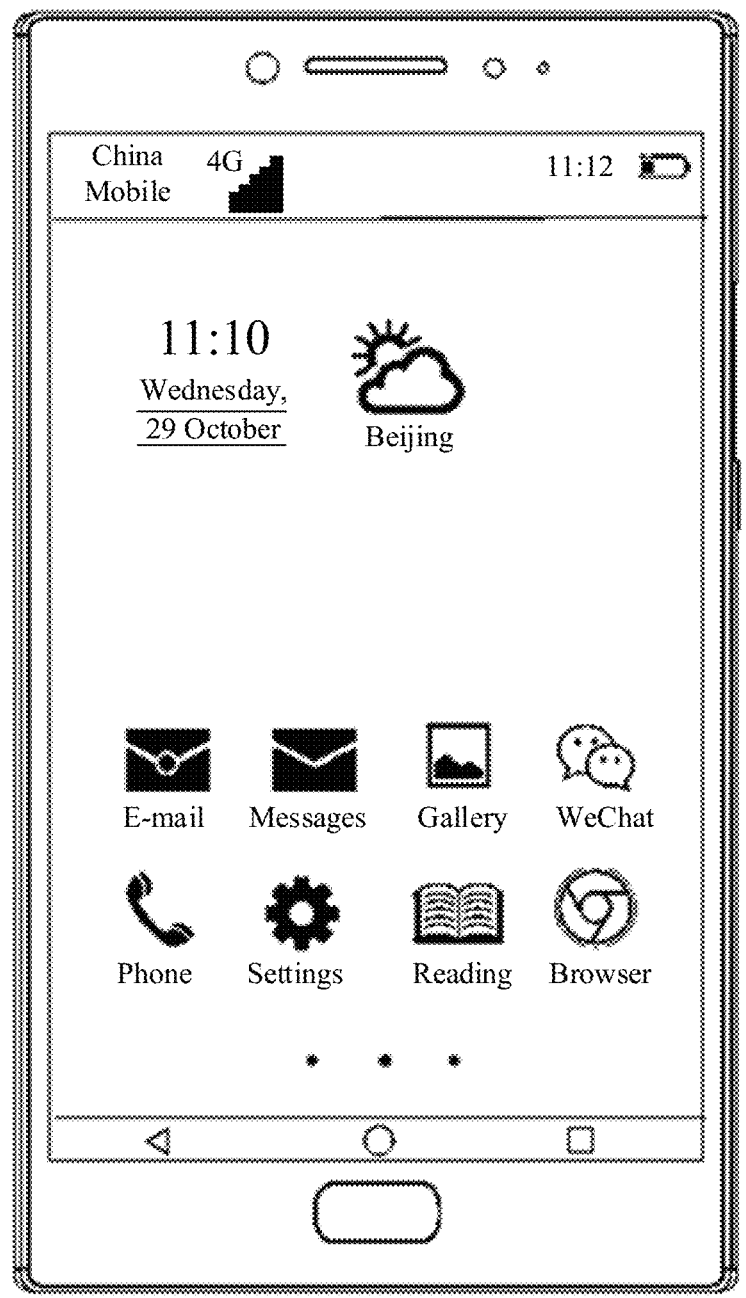
Figure 10C:
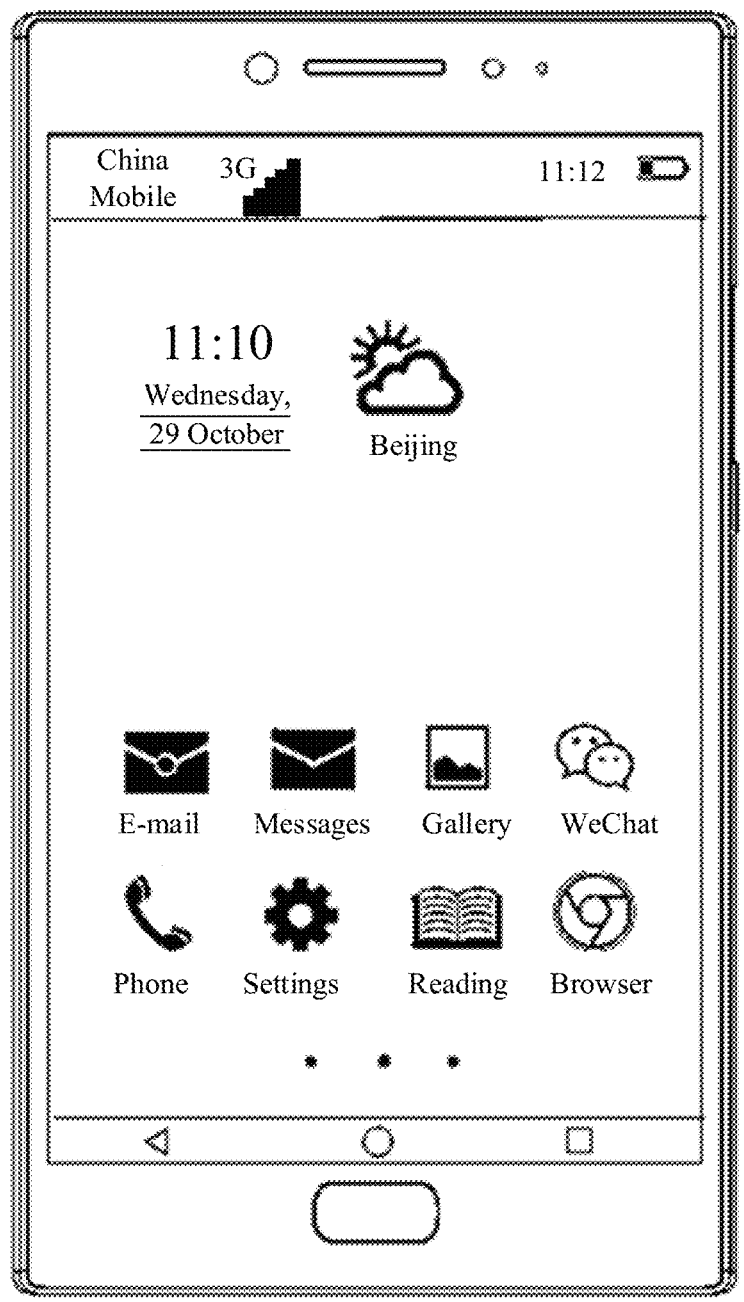
Figure 10D:
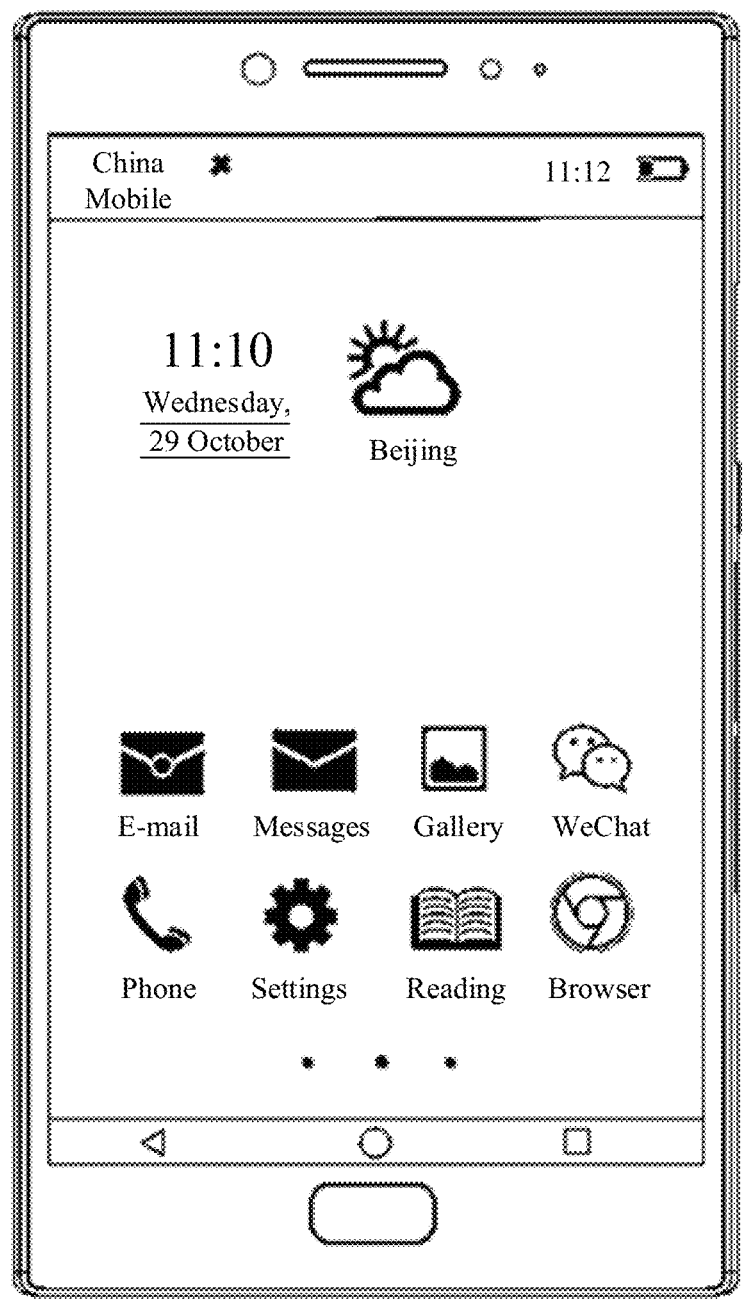

In the 5G network, when the mobile phone receives an operation of enabling a 5G switch or disabling an airplane mode by a user, or is moved from a non-5G network coverage area to a 5G network coverage area, after the mobile phone finds the 5G network, the mobile phone performs a NAS registration process in the 5G network. After the mobile phone completes NAS registration and is attached to the 5G network, a 5G identifier is displayed on the status bar of the mobile phone, as shown in FIG. 10(a). After the mobile phone starts the IMS registration procedure, if the mobile phone does not receive an IMS registration accept message from a network side when the timing duration of the IMS timer reaches 35 seconds, the following statuses may be displayed on the status bar of the mobile phone. In a possible case, information indicating that the 5G network is unavailable is displayed on the status bar of the mobile phone, as shown in FIG. 10(d). In another possible case, the mobile phone is switched to a non-5G network. For example, after the mobile phone is switched to the 4G network, a 4G network identifier is displayed on the status bar of the mobile phone, as shown in FIG. 10(b). When the mobile phone is switched to a 3G network, a 3G network identifier is displayed on the status bar of the mobile phone, as shown in FIG. 10(c). When the mobile phone is switched to a 2G network, a 2G network identifier is displayed on the status bar of the mobile phone.

After the mobile phone starts the IMS registration procedure in the 5G network, the mobile phone may test the timing duration of the IMS timer in the following two manners. In one manner, timing starts when an AMF entity receives a PDU connection establishment request (as described in operation 410), and ends when the information indicating that the 5G network is unavailable or a non-5G network identifier is displayed on the status bar of the mobile phone. A difference between timing starting time and timing ending time is the specified duration of the IMS timer. In another manner, timing starts when a P-CSCF receives an IMS registration request (as described in operation 413), and ends when the information indicating that the 5G network is unavailable is displayed on the status bar of the mobile phone. A difference between timing starting time and timing ending time is the specified duration of the IMS timer.

In embodiments of this application, division of modules is an example, and is merely logical function division. In an actual implementation, there may be another division manner. In addition, function modules in embodiments of this application may be integrated into one processor, or each of the modules may exist alone physically, or two or more modules may be integrated into one module. The integrated module may be implemented in a form of hardware, or may be implemented in a form of a software function module. It may be understood that, for functions or implementations of the modules in embodiments of this application, further refer to related descriptions in the method embodiments.

Based on a same inventive concept as the method embodiments, an embodiment of this application provides a communications apparatus. The communications apparatus may be a terminal device. The terminal device may be configured to implement the method performed by the terminal device in embodiments in FIG. 3 to FIG. 8. Alternatively, the apparatus may be a network device, for example, an access network device.

Figure 11:
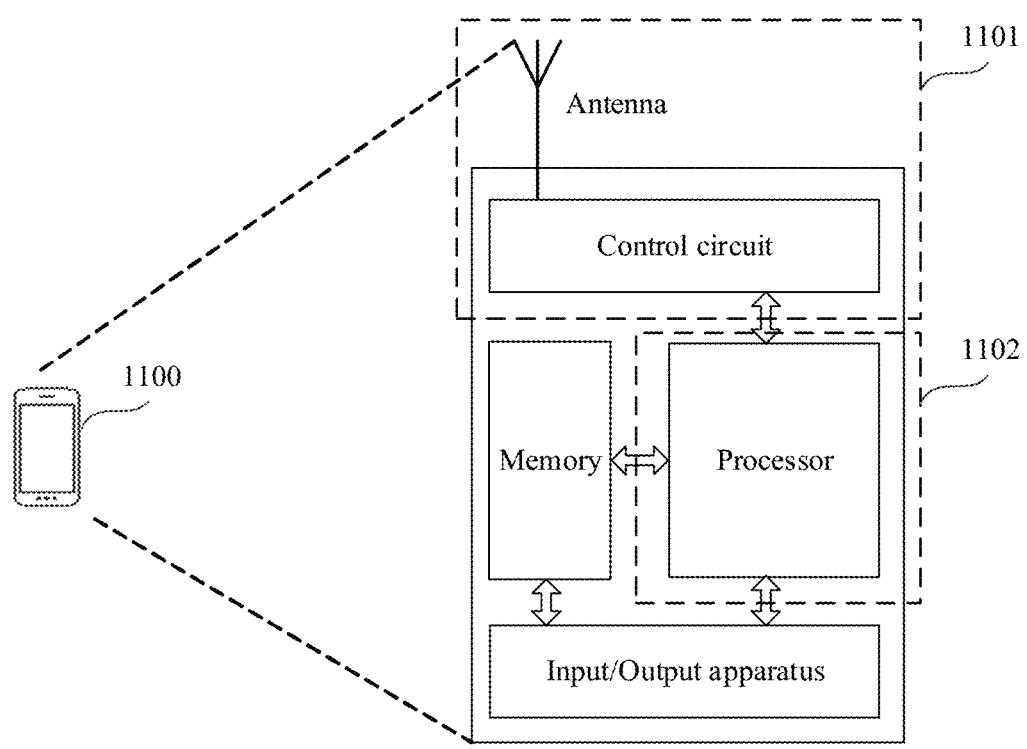
FIG. 11 is a schematic diagram of a structure of a terminal device according to an embodiment of this application.

FIG. 11 is a schematic diagram of a structure of a terminal device according to an embodiment of this application. The terminal device is applicable to the system shown in FIG. 2, and performs a function of the terminal device in the foregoing method embodiments. For ease of description, FIG. 11 shows only main components of the terminal device. As shown in FIG. 11, a terminal device 1101 includes a processor, a memory, a control circuit, an antenna, and an input/output apparatus. The processor is mainly configured to process a communication protocol and communication data, control the entire terminal device, execute a software program, and process data of the software program, for example, configured to support the terminal device in performing actions described in the foregoing method embodiments. The memory is configured to store the software program and the data. The control circuit is mainly configured to perform conversion between a baseband signal and a radio frequency signal, and process the radio frequency signal. The control circuit together with the antenna may also be referred to as a transceiver, mainly configured to receive and send a radio frequency signal in a form of an electromagnetic wave. The input/output apparatus, for example, a touchscreen, a display, or a keyboard, is mainly configured to receive data entered by a user and output data to the user.

After the terminal device is powered on, the processor may read the software program in the memory, explain and execute instructions of the software program, and process the data of the software program. When data needs to be sent in a wireless manner, after the processor performs baseband processing on the to-be-sent data, the processor outputs a baseband signal to a radio frequency circuit. After performing radio frequency processing on the baseband signal, the radio frequency circuit sends a radio frequency signal through an antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data and processes the data.

A person skilled in the art may understand that for ease of description, FIG. 11 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in this embodiment of this application.

In an embodiment, the terminal device may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit may be integrated into the processor in FIG. 11. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the memory in a form of a software program, and the processor executes the software program to implement a baseband processing function.

In this embodiment of this application, the control circuit and the antenna having sending and receiving functions may be considered as a transceiver unit 1101 of the terminal device 1100. For example, the transceiver unit 1101 is configured to support the terminal device in performing the receiving function and the sending function. A processor 1102 having a processing function is considered as a processing unit of the terminal device. As shown in FIG. 11, the terminal device 11 includes the transceiver unit 1101 and the processor 1102. The transceiver unit may also be referred to as a transceiver machine, a transceiver, a transceiver apparatus, or the like. In an embodiment, a component configured to implement a receiving function in the transceiver unit 1101 may be considered as a receiving unit. A component configured to implement a sending function in the transceiver unit 1101 may be considered as a sending unit. In other words, the transceiver unit 1101 includes the receiving unit and the sending unit. The receiving unit may also be referred to as a receiver, an input port, a receiving circuit, or the like. The sending unit may be referred to as a transmitter machine, a transmitter, a transmitting circuit, or the like.

The processor 1102 may be configured to execute instructions stored in the memory, to control the transceiver unit 1101 to receive a signal and/or send a signal, to complete a function of the terminal device in the foregoing method embodiments. The processor 1102 further includes an interface, configured to implement a signal input/output function. In an embodiment, a function of the transceiver unit 1101 may be implemented by using a transceiver circuit or a transceiver-dedicated chip.

An embodiment of this application further provides an IMS registration duration management system, including a terminal device, a first network device, and a second network device, where the terminal device is configured to: send, in a first network to which the terminal device is attached, an Internet protocol multimedia subsystem IMS registration request to the first network device, and start an IMS timer corresponding to the first network. The first network device is configured to: after receiving the IMS registration request, determine whether to send a registration accept message. The terminal device is further configured to deactivate the first network if the registration accept message from the first network device is not received when timing duration of the IMS timer corresponding to the first network reaches first specified duration. The terminal device is further configured to send, in a second network to which the terminal device is attached, an Internet protocol multimedia subsystem IMS registration request to the second network device, and start an IMS timer corresponding to the second network. The second network device is configured to: after receiving the IMS registration request, determine whether to send a registration accept message. The terminal device is further configured to deactivate the second network if the registration accept message from the second network device is not received when timing duration of the IMS timer corresponding to the second network reaches second specified duration. The first specified duration is different from the second specified duration.

In an embodiment, the first network is a 4G network, and the second network is a 5G network; or the first network is a 5G network, and the second network is a 4G network.

In an embodiment, the IMS timer corresponding to the first network is different from the IMS timer corresponding to the second network.

In an embodiment, when the first network is a 4G network, and the second network is a 5G network, the first specified duration is greater than second specified duration.

In an embodiment, the first network is a 4G network, and the terminal device is further configured to deactivate the 4G network if the registration accept message from the first network device is not received when the timing duration of the IMS timer corresponding to the 4G network reaches the first specified duration.

In an embodiment, the first network is a 4G network, the second network is a 5G network, and the terminal device is further configured to: deactivate the 5G network or perform IMS registration in the 4G network if the registration accept message from the second network device is not received when the timing duration of the IMS timer corresponding to the 5G network reaches the first specified duration.

In an embodiment, the first network is a 4G network, the second network is a 5G network, and the terminal device is further configured to: when the first network supports circuit switched fallback and a voice service, search for and fall back to a 2G or 3G network if the registration accept message from the first network device is not received when the timing duration of the IMS timer corresponding to the first network reaches the first specified duration, to access a voice service.

In an embodiment, the terminal device further includes a display, the first network is a 5G network, and the terminal device is further configured to: when the terminal device is attached to the 5G network, display an identifier of the 5G network on the display; and when it is determined that the registration accept message from the second network device is not received when the timing duration of the IMS timer corresponding to the 5G network reaches the second specified duration, control the display to display information indicating that the 5G network is unavailable, or control the display to display an identifier of a 4G network when the 4G network is found.

In an embodiment, the terminal device further includes a display, the first network is a 4G network, and the terminal device is further configured to: when the terminal device is attached to the 4G network, display an identifier of the 4G network on the display; and when it is determined that the registration accept message from the first network device is not received when the timing duration of the IMS timer corresponding to the 4G network reaches the first specified duration, control the display to display information indicating that the 4G network is unavailable, or control the display to display an identifier of the 2G or 3G network when the 2G or 3G network is found.

In an embodiment, the first network device is further configured to send a registration accept message to the terminal device. The terminal device is further configured to: if the registration accept message is received before the timing duration of the IMS timer corresponding to the first network reaches the first specified duration, determine that the IMS registration succeeds.

In an embodiment, the second network device is further configured to send a registration accept message to the terminal device. The terminal device is further configured to: if the registration accept message is received before the timing duration of the IMS timer corresponding to the second network reaches the second specified duration, determine that the IMS registration succeeds.

In an embodiment, the first specified duration is less than 128 seconds, and the second specified duration is less than 128 seconds.

Based on the same concept as the foregoing method embodiments, an embodiment of this application further provides a computer-readable storage medium. The computer-readable storage medium stores some instructions. When these instructions are invoked and executed by a computer, the computer is enabled to perform the method in the foregoing method embodiments and any possible design of the foregoing method embodiments. In this embodiment of this application, the computer-readable storage medium is not limited. For example, the computer-readable storage medium may be a RAM (random access memory) or a ROM (read-only memory).

Based on a same concept as the foregoing method embodiments, this application further provides a computer program product. When being invoked and executed by a computer, the computer program product can perform the method in the foregoing method embodiments and any possible design of the foregoing method embodiments.

Based on a same concept as the foregoing method embodiment, this application further provides a chip. The chip is coupled to a transceiver, and is configured to complete the method in any one of the foregoing method embodiments and the possible implementations of the foregoing method embodiments. "Coupling" means that two components are directly or indirectly combined with each other. The combination may be fixed or movable, and the combination may allow communication of fluid, electricity, an electrical signal, or another type of signal between the two parts.

Figure 12:
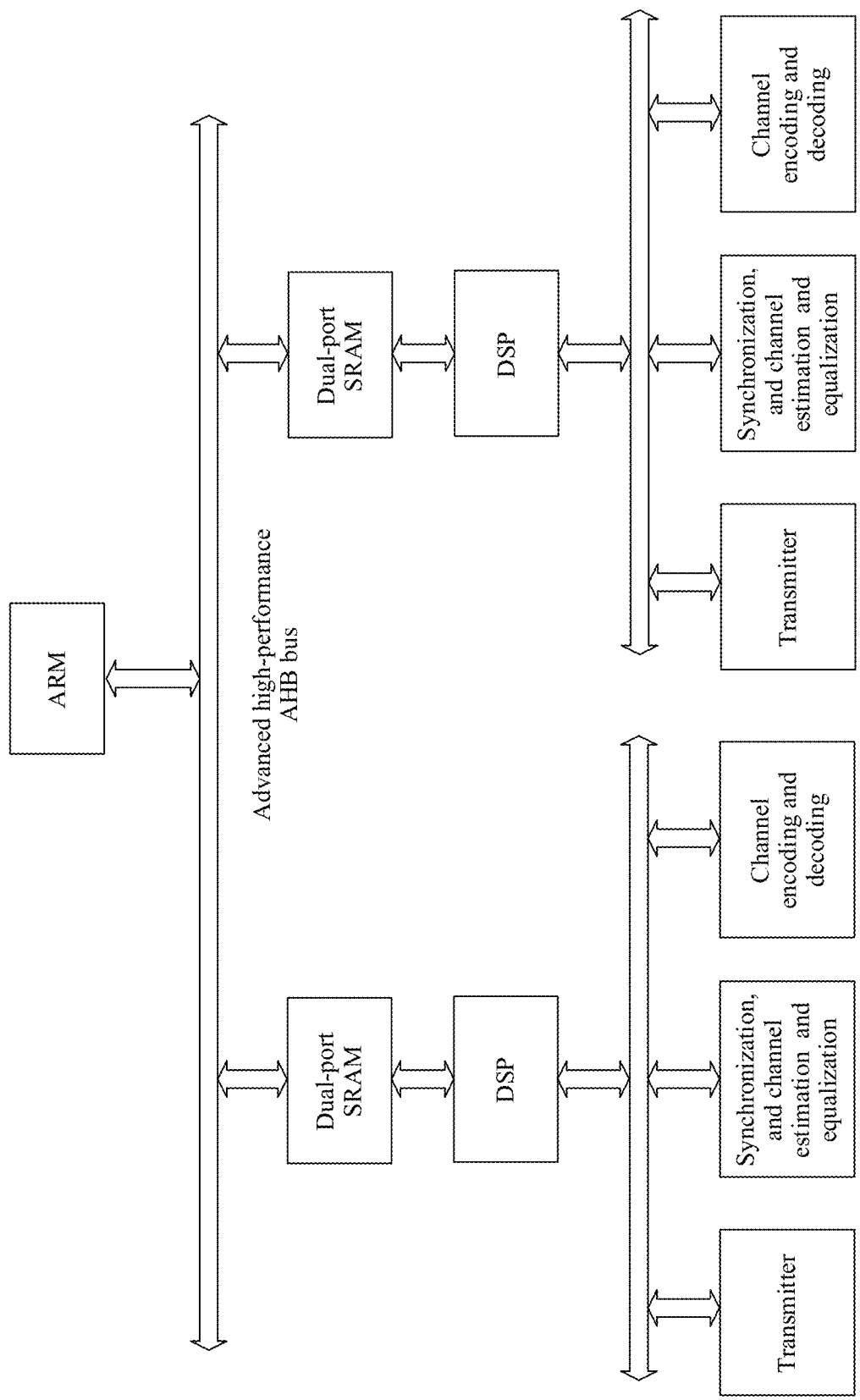
FIG. 12 is a schematic diagram of an architecture of a baseband chip according to an embodiment of this application.

An embodiment of this application further provides a baseband chip. The baseband chip may be configured to combine to-be-transmitted baseband signals or decode a received baseband signal. FIG. 12 is an example of a schematic diagram of an architecture of the baseband chip.

As shown in FIG. 12, the baseband chip includes a microprocessor and a digital signal processor (DSP).

The microprocessor may implement, by using a real-time operating system (RTOS) (such as Nucleus Plus), multi-task scheduling, inter-task communication, peripheral device driving, and communication between the microprocessor and a DSP subsystem or another module. The microprocessor also provides the following functions: control and manage an entire mobile station, including timing control, digital system control, radio frequency control, and power saving control; and implement all software functions, namely, communication between a physical layer of a wireless communications protocol and a protocol stack, and a higher layer protocol stack (TCP/IP) and the like). If the microprocessor is used for a function machine, a man-machine interaction interface (MMI) and application software are further included.

The DSP subsystem processes all algorithms at the physical layer, including channel coding, encryption, channel equalization, voice coding/decoding, and modulation/demodulation. A data communication means between the DSP subsystem and a microprocessor subsystem include a dual-port random access memory (RAM), a multi-bus shared resource (for example, a multilayer bus protocol), and the like. A multimode and multi-frequency baseband chip may contain a plurality of DSPs.

Both the microprocessor and the DSP subsystem may have respective independent caches, a shared on-chip memory (static random access memory (SRAM)), and a shared external memory. The external memory generally supports a synchronous dynamic random access memory (SDRAM), a NAND flash RAM, and the like. A flash erasable read-only memory (flash ROM, also referred to as a flash memory) may be configured to store a diskless boot read-only memory (ROM) interface (boot ROM) and a control program (CP) ROM that links an operating system and a user application program. The ROM interface is mainly configured to connect to the memory flash ROM that stores a program, and a RAM interface is mainly configured to connect to a static RAM (SRAM) that stores temporarily stored data. The on-chip large-capacity static random access memory (SRAM) is widely used, which can reduce power consumption and system costs.

The baseband chip usually supports a plurality of interfaces to facilitate communication with an application processor and add other modules such as a wireless-fidelity module (Wi-Fi) and a global positioning system (GPS). The interfaces include a universal asynchronous receiver/transmitter (UART), a multi-media interface (MMI), a universal serial bus (USB), a serial peripheral interface (SPI), and the like.

Communication between the microprocessor and an external interface may be performed through direct memory access (DMA). If the baseband chip is not integrated with a radio frequency (RF) module, an RF dedicated interface is further provided.

The terminal device, the computer storage medium, the computer program product, or the chip provided in embodiments of this application is configured to perform a corresponding method provided above. Therefore, for beneficial effects that can be achieved, refer to the beneficial effects in the corresponding methods provided above. Details are not described herein again.

Based on the foregoing description of the embodiments, a person skilled in the art may understand that for the purpose of convenient and brief description, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into modules or units is merely logical function division and may be other division during actual implementation. For example, a plurality of units or components may be combined or integrated into another apparatus, or some features may be discarded or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, in other words, may be located at one place, or may be distributed on different places. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the operations of the methods described in embodiments of this application. The foregoing storage medium includes any medium that can store program code, such as a USB flash drive, a removable hard disk, a read-only memory, a random access memory, a magnetic disk, or an optical disc.

The foregoing content is merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device, comprising:
   a transceiver;
   a memory; and
   a processor;
   wherein the transceiver is configured to send, in a network to which the terminal device is attached, an Internet protocol multimedia subsystem (IMS) registration request to a network device in the network, wherein the network device is one of a first network device or a second network device, wherein the first network device and the second network device are in a first network and a second network respectively, wherein each of the first network and the second network corresponds to an IMS timer with a different specified duration; and
   wherein the processor is configured to execute instructions stored in the memory and to cause the terminal device to:
      when the IMS registration request is sent to the network device, start an IMS timer corresponding to the network to which the terminal device is attached, and deactivate the network when a registration accept message from the network device is not received when the corresponding IMS timer expires.

2. The terminal device according to claim 1, wherein each of the first network and the second network is a 4G network or a 5G network.

3. The terminal device according to claim 1, wherein the IMS timer corresponding to the first network is different from the IMS timer corresponding to the second network.

4. The terminal device according to claim 1, wherein when the first network is a 4G network, and the second network is a 5G network, a first specified duration for the IMS timer corresponding to the first network is greater than a second specified duration for the IMS timer corresponding to the second network.

5. The terminal device according to claim 1, wherein the first network is a 4G network, and the processor is further configured to cause terminal device to:
   deactivate the 4G network when the registration accept message from the first network device is not received when the IMS timer corresponding to the 4G network expires.

6. The terminal device according to claim 1, wherein the first network is a 4G network, the second network is a 5G network, and the processor is further configured to cause the terminal device to:
   deactivate the 5G network or perform IMS registration in the 4G network when the registration accept message from the second network device is not received when the IMS timer corresponding to the 5G network expires.

7. The terminal device according to claim 1, wherein the first network is a 4G network, the second network is a 5G network, and the processor is further configured to cause the terminal device to:
   when the first network supports circuit switched fallback and a voice service, search for and fall back to a 2G or 3G network when the registration accept message from the first network device is not received when the IMS timer corresponding to the first network expires, to access a voice service.

8. The terminal device according to claim 1, further comprising:
   a display;
   wherein the second network is a 5G network; and
   wherein the processor is further configured to cause the terminal device to:
      when the terminal device is attached to the 5G network, display an identifier of the 5G network on the display; and
      when it is determined that an IMS registration in the 5G network fails, control the display to display information indicating that the 5G network is unavailable, or control the display to display an identifier of a 4G network when the 4G network is found.

9. The terminal device according to claim 1, further comprising:
   a display;
   wherein the first network is a 4G network; and
   wherein the processor is further configured to cause the terminal device to:
      when the terminal device is attached to the 4G network, display an identifier of the 4G network on the display; and
      when it is determined that an IMS registration in the 4G network fails, control the display to display information indicating that the 4G network is unavailable, or control the display to display an identifier of a 2G or 3G network when the 2G or 3G network is found.

10. The terminal device according to claim 1, wherein the processor is further configured to cause the terminal device to:

when the registration accept message is received before the IMS timer corresponding to the first network expires, determine that an IMS registration succeeds.

11. The terminal device according to claim 1, wherein the processor is further configured to cause the terminal device to:
when the registration accept message is received before the IMS timer corresponding to the second network expires, determine that an IMS registration succeeds.

12. The terminal device according to claim 1, wherein a first specified duration for the IMS timer corresponding to the first network is less than 128 seconds, and a second specified duration for the IMS timer corresponding to the second network is less than 128 seconds.

13. A chip, comprising:
a processor; and
a communications interface;
wherein the communications interface is configured to receive code instructions, and transmit the code instructions to the processor; and
wherein the processor is configured to invoke the code instructions transmitted by the communications interface to:
when an Internet protocol multimedia subsystem (IMS) registration request is sent to a network device in an attached network, start an IMS timer corresponding to the attached network, and deactivate the network when a registration accept message from the network device is not received when an IMS timer corresponding to the network expires;
wherein the attached network is one of a first network and a second network;
wherein the network device is one of a first network device in the first network and a second network device in the second network;
wherein each of the first network and the second network corresponds to an IMS timer with a different specified duration.

14. The chip according to claim 13, wherein the IMS timer corresponding to the first network is different from the IMS timer corresponding to the second network.

15. The chip according to claim 13, wherein when the first network is a 4G network, and the second network is a 5G network, a first specified duration for the IMS timer corresponding to the first network is greater than a second specified duration for the IMS timer corresponding to the second network.

16. The chip according to claim 13, wherein the first network is a 4G network, the second network is a 5G network, and the processor is configured to:
when the first network supports circuit switched fallback and a voice service, search for and fall back to a 2G or 3G network when the registration accept message from the first network device is not received when the IMS timer corresponding to the first network expires, to access a voice service.

17. The chip according to claim 13, wherein the first network is a 4G network, and the processor is configured to:
deactivate the 4G network when the registration accept message from the first network device is not received when the IMS timer corresponding to the 4G network expires.

18. The chip according to claim 13, wherein the second network is a 5G network, and the processor is configured to:
when the registration accept message from the second network device is not received when the IMS timer corresponding to the 5G network expires, deactivate the 5G network, or perform IMS registration in a 4G network when the 4G network is found.

19. An IMS registration duration management system, comprising:
a terminal device;
a first network device; and
a second network device;
wherein the terminal device is configured to send, in a network to which the terminal device is attached, an Internet protocol multimedia subsystem (IMS) registration request to a network device, and start an IMS timer corresponding to the network;
wherein the network device is configured to: after receiving the IMS registration request, determine whether to send a registration accept message;
wherein the terminal device is further configured to deactivate the network when the registration accept message from the network device is not received when the IMS timer corresponding to the network expires;
wherein the network is one of a first network and a second network;
wherein the network device is one of the first network device in the first network and the second network device in the second network;
wherein each of the first network and the second network corresponds to an IMS timer with a different specified duration.

20. The system according to claim 19, wherein each of the first network and the second network is a 4G network or a 5G network.

* * * * *